US007325122B2

(12) United States Patent
Abdelilah et al.

(10) Patent No.: US 7,325,122 B2
(45) Date of Patent: Jan. 29, 2008

(54) FACILITATING INTER-DSP DATA COMMUNICATIONS

(75) Inventors: Youseff Abdelilah, Holly Springs, NC (US); Bartholomew Blaner, Underhill Center, VT (US); Gordon Taylor Davis, Chapel Hill, NC (US); Jeffrey Haskell Derby, Chapel Hill, NC (US); Joseph Franklin Garvey, Cary, NC (US); Malcolm Scott Ware, Austin, TX (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 10/783,757

(22) Filed: Feb. 20, 2004

(65) Prior Publication Data

US 2005/0188129 A1  Aug. 25, 2005

(51) Int. Cl.
G06F 13/16 (2006.01)
G06F 15/163 (2006.01)

(52) U.S. Cl. .................... 712/14; 710/22; 711/148; 711/165; 712/35

(58) Field of Classification Search .................. None
See application file for complete search history.

(56) References Cited

U.S. PATENT DOCUMENTS 5,481,727 A    1/1996  Asano et al. ............... 395/477
5,572,695 A   11/1996  Andrews et al. ........... 395/412
5,659,698 A    8/1997  Weng et al. ............. 395/421.1
6,012,136 A *  1/2000  Brown ....................... 712/35
6,088,783 A *  7/2000  Morton ...................... 712/22
6,134,229 A   10/2000  Schwaller et al. .......... 370/336
6,148,389 A * 11/2000  So ............................ 712/35
6,178,180 B1   1/2001  Eng et al. .................. 370/466
6,240,086 B1   5/2001  Morgan et al. ............ 370/352
6,256,723 B1   7/2001  Hudson et al. .............. 712/35
6,327,648 B1  12/2001  Hedayat et al. ............. 712/35
6,338,130 B1   1/2002  Sinibaldi et al. ........... 712/35
6,496,740 B1* 12/2002  Robertson et al. .......... 700/20

* cited by examiner

*Primary Examiner*—Gary Portka
(74) *Attorney, Agent, or Firm*—Robert A. Voigt, Jr.; Winstead PC

(57) ABSTRACT

A method, computer program product and system for facilitating inter-digital signal processing (DSP) data communications. A direct memory access (DMA) controller may be configured to facilitate transfers of data between a first and a second DSP processor core coupled to the DMA controller. The DMA controller may read a data structure, referred to as a "buffer descriptor block," to perform the data transfer. The buffer descriptor block may store both a source address and a destination address indicating where the data is to be retrieved and stored. The buffer descriptor block may further store a value, e.g., number of bytes, indicating a size of the data to be transferred. The DMA controller may then transfer the data located at the source address in the first DSP processor core, with a size, e.g., number of bytes, indicated from the buffer descriptor block, to the destination address in the second DSP processor core.

9 Claims, 18 Drawing Sheets

FACILITATING INTER-DSP DATA COMMUNICATIONS

TECHNICAL FIELD

The present invention relates to the field of digital signal processing (DSP), and more particularly to facilitating inter-DSP data communications between software tasks located in separate DSP processor cores in a DSP complex.

BACKGROUND INFORMATION

Digital signal processing (DSP) may refer to a category of techniques that analyzes signals from sources such as sound, weather satellites and earthquake monitors. These signals are converted into digital data and analyzed using various algorithms such as the fast fourier transform. Once a signal has been reduced to numbers, its components can be isolated, analyzed and rearranged more easily than in analog form. DSP is used in many fields, including biomedicine, sonar, radar, seismology, speech and music processing, imaging and communications.

One technology that uses DSP is a digital subscriber line (DSL). DSL is a technology that increases the digital capacity of ordinary telephone lines (the local loops) into the home or office. DSL speeds are tied to the distance between the customer and the telco central office. At the telco central office, DSL traffic is aggregated in a unit called the DSL Access Multiplexer (DSLAM) and forwarded to the appropriate Internet service provider (ISP) or data network.

In such DSP systems, a single DSP processor core may not have enough processing power to handle the number of necessary calculations to be made. Hence, such systems may implement dedicated hard-wired functions. However, these hard-wired functions require a longer development time and are often not flexible enough to make changes to accommodate evolving international standards. Consequently, there may be a desire in such a system architecture to implement multiple DSP processor cores instead of a single DSP processor core.

Each DSP processor core may be configured to perform operations on real-time and/or asynchronous streamed data. The data may include software "tasks" to be performed by the DSP processor core. A task may refer to operations to be performed by a designated DSP processor core. An example of a task may be to perform layer 2 error correction or perform the fast fourier transform on an incoming digital signal.

An architecture and technique has been developed that allows tasks to communicate with other tasks within a single DSP processor core. Each task may communicate with another task such as acquiring information from that task in order to perform its operation. In such an architecture, each task may have a data structure associated with it, referred to as an inter task control block, used to store status and control information. Each inter task control block may be capable of transmitting its status and control information to another inter task control block thereby allowing each task the ability to communicate its status and control information to another task. Further, in such an architecture, data necessary to perform an operation may be transmitted from one task to another task by a stream connector. Additional details regarding this architecture are disclosed in U.S. Pat. No. 5,625,845, entitled "System for Facilitating Continuous, Real-Time, Unidirectional, and Asynchronous Intertask and End-Device Communication in a Multimedia Data Processing System Using Open Architecture Data Communication Modules," which is hereby incorporated herein by reference in its entirety.

However, this architecture is limited to tasks communicating with another task in a single DSP processor core. By limiting such communication to a single DSP processor core, DSP systems may be forced to implement a single DSP processor core instead of implementing multiple DSP processor cores. By limiting a system to implementing a single DSP processor core, the system may not have enough processing power to handle the number of necessary calculations to be made.

Therefore, there is a need in the art to facilitate inter-DSP data communications between software tasks located in separate DSP processor cores in a DSP complex.

SUMMARY

The problems outlined above may at least in part be solved in some embodiments by a buffer descriptor block associated with each data transfer between a first DSP processor core and a second DSP processor core. A direct memory access controller coupled to both the first and second DSP processor core may be configured to read the buffer descriptor block in order to perform the data transfer. The buffer descriptor block may be configured to store both a source address and a destination address where the source address indicates where data is to be retrieved from in the local memory of the first DSP processor core and the destination address indicates where data is to be stored in the local memory of the second DSP processor core. The buffer descriptor block may further be configured to store a value ("Count"), e.g., number of bytes, indicating a size of the data to be transferred. The direct memory access controller may then transfer data located at the source address in the first DSP processor core, with a size, e.g., number of bytes, indicated from the count value, to the destination address in the second DSP processor core using the information obtained from the buffer descriptor block.

In one embodiment of the present invention, a method for facilitating inter-digital signal processing (DSP) data communication may comprise the step of reading a first data structure associated with a block of local memory in a first DSP processor core in a complex comprising a plurality of DSP processor cores. The first data structure may comprise a first source address indicating a first address of where data is stored in the local memory of the first DSP processor core. The first data structure may further comprise an indication of a size of a block of memory. The first data structure may further comprise a first destination address indicating a second address of where data is to be stored in a local memory of a second DSP processor core. The method may further comprise initiating a transfer of moving data the size of the block of memory located in the first source address in the local memory of the first DSP processor core to the first destination address in the local memory of the second DSP processor core.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for facilitating inter-digital signal processing (DSP) data communications. In one embodiment of the present invention, a direct memory access controller may be coupled to a plurality of DSP processor cores. The direct memory access controller may be configured to facilitate transfers of data between two DSP processor cores using a data structure referred to as a buffer descriptor block. Each data transfer is associated with a buffer descriptor block. The direct memory access controller coupled to both a first and a second DSP processor core may be configured to read the buffer descriptor block in order to perform the data transfer. The buffer descriptor block may be configured to store both a source address and a destination address where the source address indicates where data is to be retrieved from in the local memory of the first DSP processor core and the destination address indicates where data is to be stored in the local memory of the second DSP processor core. The buffer descriptor block may further be configured to store a value ("Count"), e.g., number of bytes, indicating a size of the data to be transferred. The direct memory access controller may then transfer data located at the source address in the first DSP processor core, with a size, e.g., number of bytes, indicated from the count value, to the destination address in the second DSP processor core using the information obtained from the buffer descriptor block.

Although the present invention is described with reference to asymmetric digital subscriber line (ASDL) technology, it is noted that the principles of the present invention may be applied to any data communication technology as well as any data flow (stream-oriented) applications in a multi-processing environment. It is further noted that embodiments applying the principles of the present invention to such data communication technologies and data flow (stream-oriented) applications in a multi-processing environment, would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
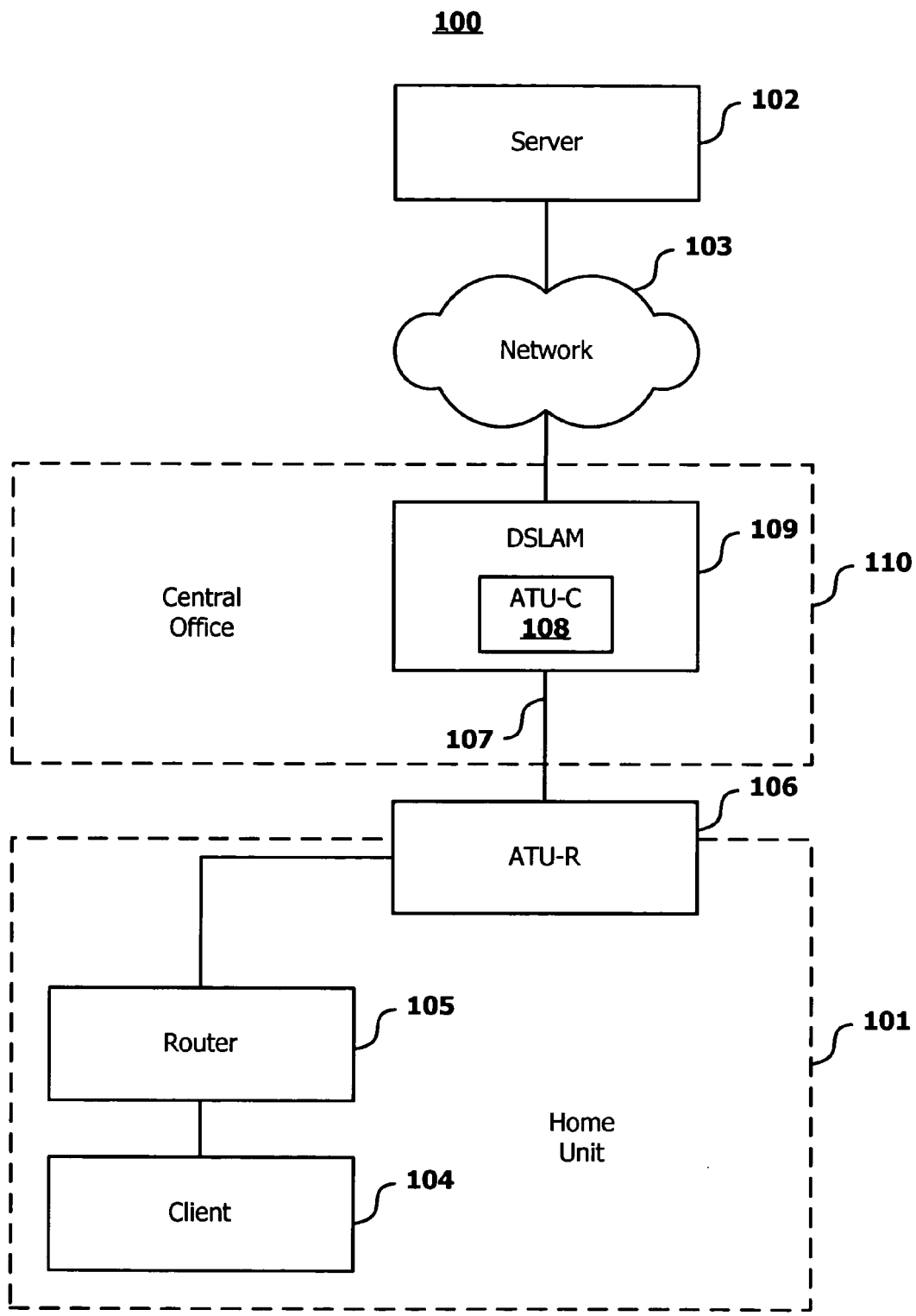
FIG. 1 illustrates a network system in accordance with an embodiment of the present invention.

FIG. 1—Network System

FIG. 1 illustrates an embodiment of a network system 100 in accordance with the present invention. System 100 may comprise a home unit 101 coupled to a central office 110 via a telephone line 107. System 100 may further comprise a server 102 coupled to home unit 101 via a network 103. Network 103 may be a Local Area Network (LAN), e.g., Ethernet, Token Ring, ARCnet, or a Wide Area Network (WAN), e.g., Internet.

Referring to FIG. 1, home unit 101 may include a client 104 coupled to a router 105. Router 105 may be coupled to an asymmetric digital subscriber line (ASDL) transceiver unit on the customer's side referred to as an "ATU-R" 106. In one embodiment, ATU-R 106 may be an external modem. In another embodiment, ATU-R 106 may be a card plugged in client 104. ATU-R 106 may be configured to provide modulation on the telephone line 107 coupled to an ATU-C 108, as discussed below, in central office 110. A more detailed description of ATU-R 106 is provided below in association with FIG. 2.

Central office 110 may include an ASDL transceiver unit on telco's side referred to as an "ATU-C" 108, e.g., line card, located within a DSL access multiplexer (DSLAM) 109. DSLAM 109 may be coupled to network 103. DSLAM 109 may be configured to intermix voice traffic and DSL traffic onto a customer's DSL line. Further, DSLAM may be configured to separate incoming phone and data signals and direct them onto the appropriate carrier's network 103.

It is noted that system 100 may comprise any number of home units 101, servers 102 and that FIG. 1 is illustrative. It is further noted that one of ordinary skill in the art will readily recognize that system 100 may include other and/or additional elements that, for clarity, are not depicted. It is further noted that system 100 may be any type of system and that FIG. 1 is not to be limited in scope to any one particular embodiment.

FIG. 2—ATU-R

Figure 2:
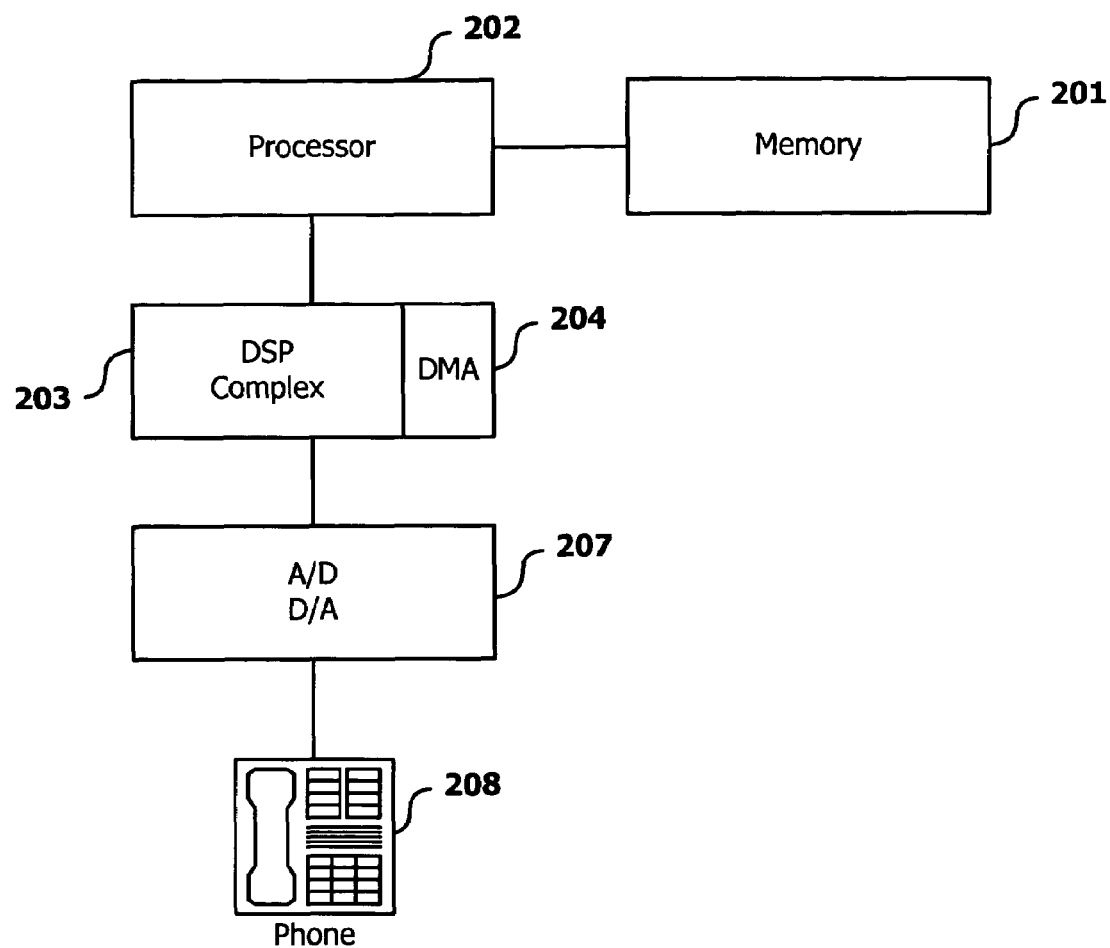
FIG. 2 illustrates an embodiment of the present invention of an ASDL transceiver unit on the customer's side in the network system.

FIG. 2 illustrates an embodiment of the present invention of ATU-R 106 (FIG. 1). Referring to FIG. 2, ATU-R 106 may comprise a memory unit 201, e.g., random access memory (RAM). The memory space of memory 201 may be referred to herein as the "general purpose processor's private memory." ATU-R 106 may further comprise a processor 202 coupled to memory unit 201. Processor 202 may be coupled to a DSP complex 203 comprising a plurality of DSP processor cores (not shown). A more detailed description of DSP complex 203 is provided below in association with FIG. 3. DSP complex 203 may include a DMA controller 204 configured to allow for the movement of data between DSP processor cores (not shown) as discussed further below. DSP complex 203 may be coupled to an analog-to-digital (A/D) and a digital-to-analog (D/A) converter 207 via bus 208. Bus 208 may be configured to allow data to be communicated between DSP complex 203 and converter 207. A/D and D/A converter 207 may be coupled to various input/output devices such as a telephone line input/output 208. It is noted that one of ordinary skill in the art will readily recognize that ATU-R 106 may include other and/or additional elements that, for clarity, are not depicted. It is further noted that FIG. 2 is not to be limited in scope to any one particular embodiment.

FIG. 3—DSP Complex

Figure 3:
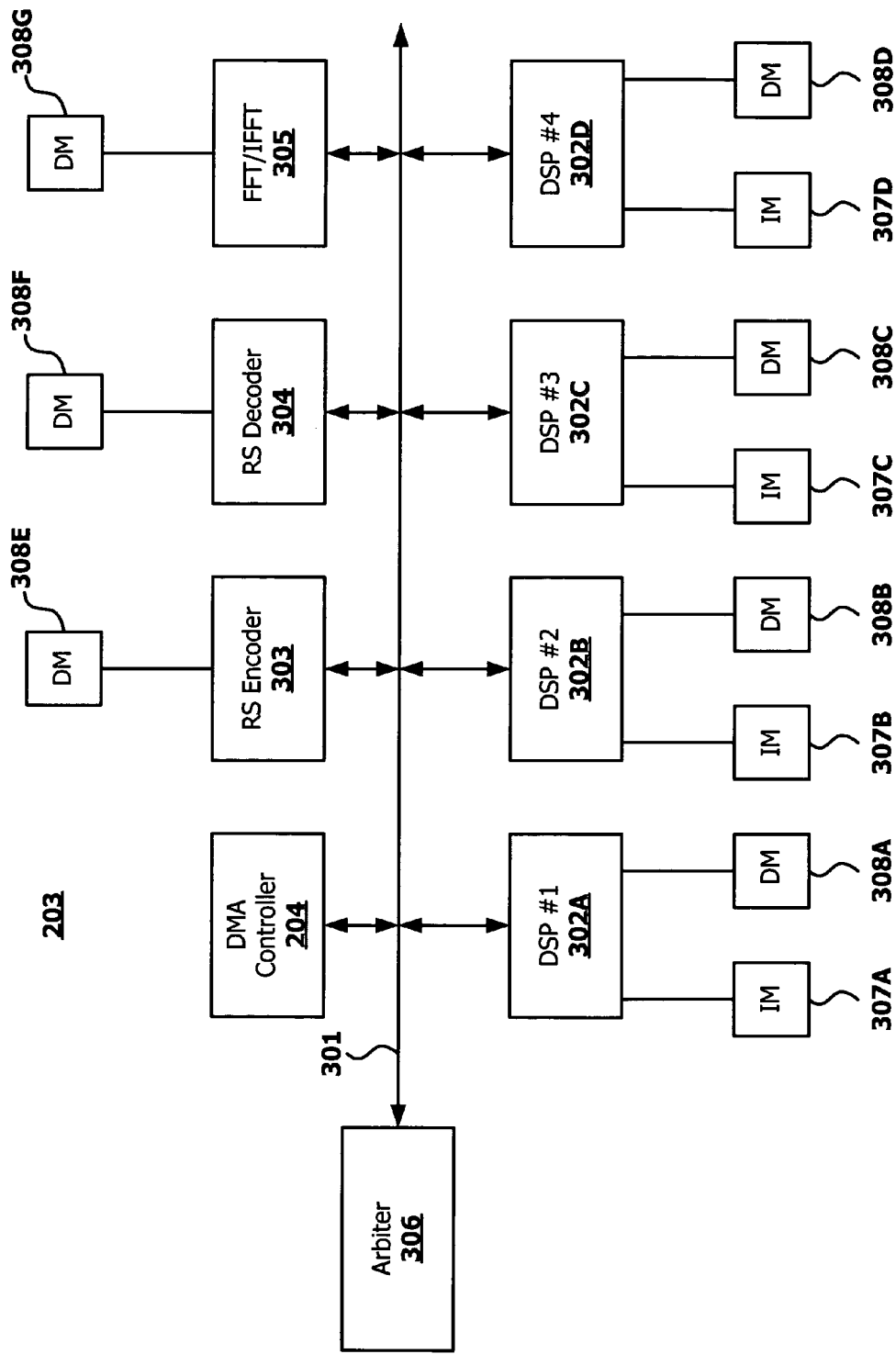
FIG. 3 illustrates an embodiment of the present invention of a DSP complex in the network system.

FIG. 3 illustrates an embodiment of the present invention of DSP complex 203 (FIG. 2). DSP complex 203 may comprise DMA controller 204 (FIG. 2). DMA controller 204 may be coupled to various other components via bus 301. DSP complex 203 may further comprise a plurality of programmable DSP processor cores 302A-D coupled to bus 301. DSP processor cores 302A-D may collectively or individually be referred to as DSP processor cores 302 or DSP processor core 302, respectively. DSP complex 203 may further comprise a Reed-Solomon encoder 303 and a Reed-Solomon decoder 304. Reed-Solomon encoder 303 is an encoder configured to encode data using an error correction technique known as Reed-Solomon coding. Further, Reed-Solomon decoder 304 is a decoder configured to decode data using the error correction technique of Reed-Solomon coding. DSP complex 203 may further comprise a unit 305 configured to compute fast fourier transform ("fft") and inverse fast fourier transform ("ifft") calculations on signals incoming/outgoing to telephone line 107 (FIG. 1). DSP complex 203 may further comprise an arbiter 306 configured to arbitrate control of bus 301 between the units of DSP complex 203 and processor 202 (FIG. 2) thereby allowing processor 202 to access DSP processor core 302 or vice-versa.

Each DSP processor core 302A-D may be coupled to an instruction memory 307A-D and a data memory 308A-D, respectively, to speed up the operation of the respective DSP processor core 302. Each hardwired DSP function, such as Reed-Solomon encoder 303, Reed-Solomon decoder 304 and fft/ifft unit 305, may be coupled to a data memory 308E-G, respectively.

As stated above, DSP complex 203 may comprise a plurality of DSP processor cores 302. Each DSP processor core 302 may be configured to perform a specific task. In one embodiment, each DSP processor core 302 may comprise a memory (not shown), e.g., non-volatile memory, to store a program to perform background tasks such as updating a data structure containing information used to indicate the current placement of data in a local memory address space in DSP processor core 302 as described further below in association with FIGS. 10, 13 and 14. In an alternative embodiment, each DSP processor core 302A-D may use instruction and data memory 307A-D and 308A-D, respectively, to hold the background task's instruction and data. In either case, memory 308A-D of DSP processor cores 302A-D, respectively, will be referred to herein as a "local memory space." Memory addresses in this local memory space may be referred to herein as a "local addresses." DSP processor core 302 may further comprise a processor (not shown) coupled to a memory (not shown). The processor (not shown) may be configured to execute the instructions of the program. Those skilled in the art will appreciate that embodiments disclosed herein may be implemented as software program instructions capable of being distributed as one or more program products, in a variety of forms, including computer program products, and that the present invention applies equally regardless of the particular type of program storage media or signal bearing media used to actually carry out the distribution. Examples of program storage media and signal bearing media include recordable type media such as floppy disks, CD-ROM, and magnetic tape transmission type media such as digital and analog communications links, as well as other media storage and distribution systems.

It is further noted that the steps of the method performed by the program mentioned above may in an alternative embodiment be implemented in hardware such as in an Application Specific Integrated Circuit (ASIC) so that non-programmable DSP elements, e.g., Reed-Solomon Encoder 303, may have data transferred to and from its data memory 308E using DMA controller 204.

As stated above, DSP complex 203 may further comprise DMA controller 204. In one embodiment, DMA controller 204 may comprise a memory (not shown), e.g., non-volatile memory, to store a program to facilitate inter-DSP data communications as described further below in association with FIGS. 9, 12 and 16. DMA controller 204 may further comprise a processor (not shown) coupled to the memory (not shown). The processor (not shown) may be configured to execute the instructions of the program. Those skilled in the art will appreciate that embodiments disclosed herein may be implemented as software program instructions capable of being distributed as one or more program products, in a variety of forms, including computer program products, and that the present invention applies equally regardless of the particular type of program storage media or signal bearing media used to actually carry out the distribution. Examples of program storage media and signal bearing media include recordable type media such as floppy disks, CD-ROM, and magnetic tape transmission type media such as digital and analog communications links, as well as other media storage and distribution systems.

It is further noted that the steps of the method performed by the program mentioned above may in an alternative embodiment be implemented in hardware such as in an Application Specific Integrated Circuit (ASIC).

Figure 4:
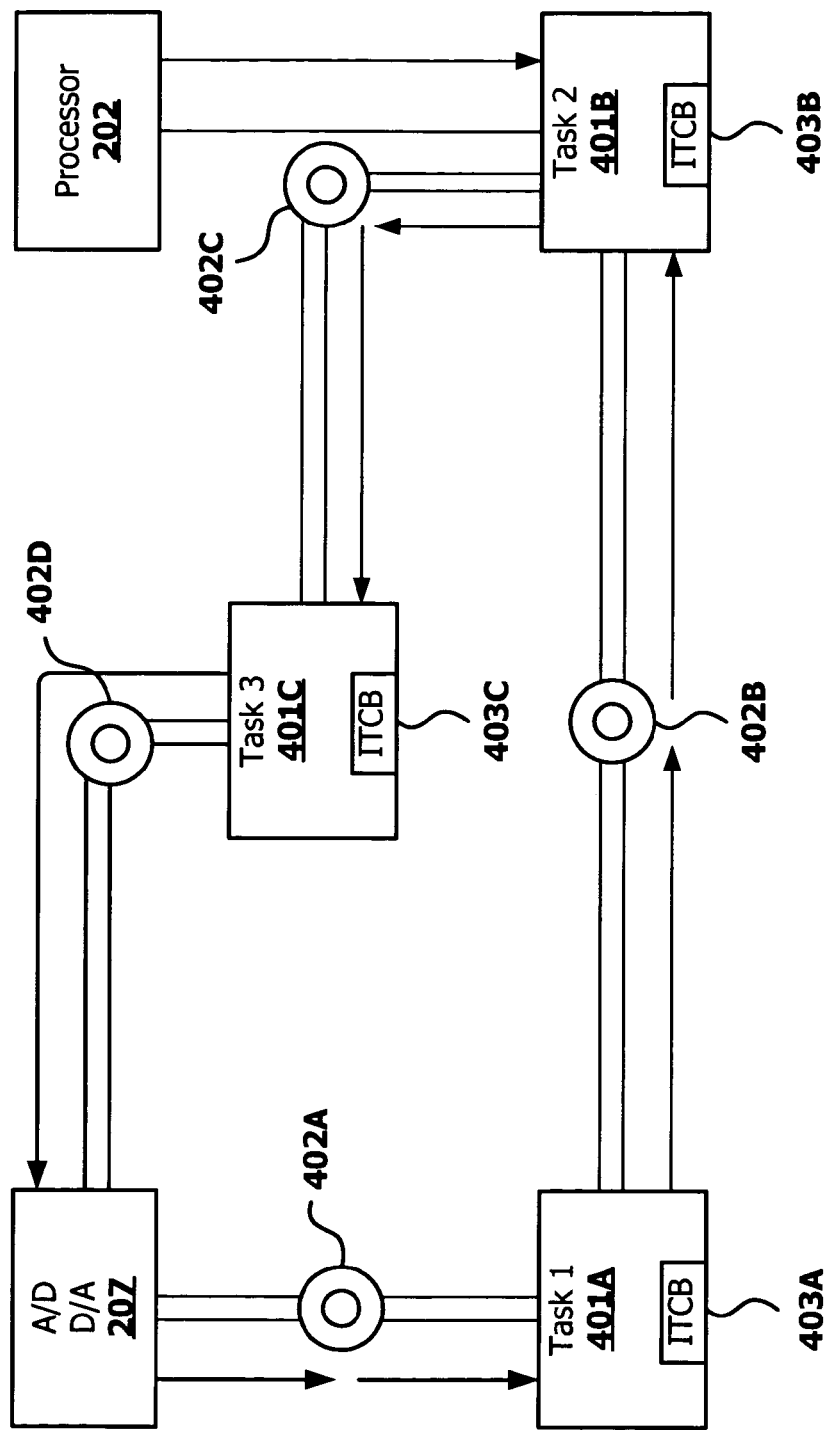
FIG. 4 illustrates an embodiment of the present invention of multiple software tasks interacting with one another.
Figure 5:
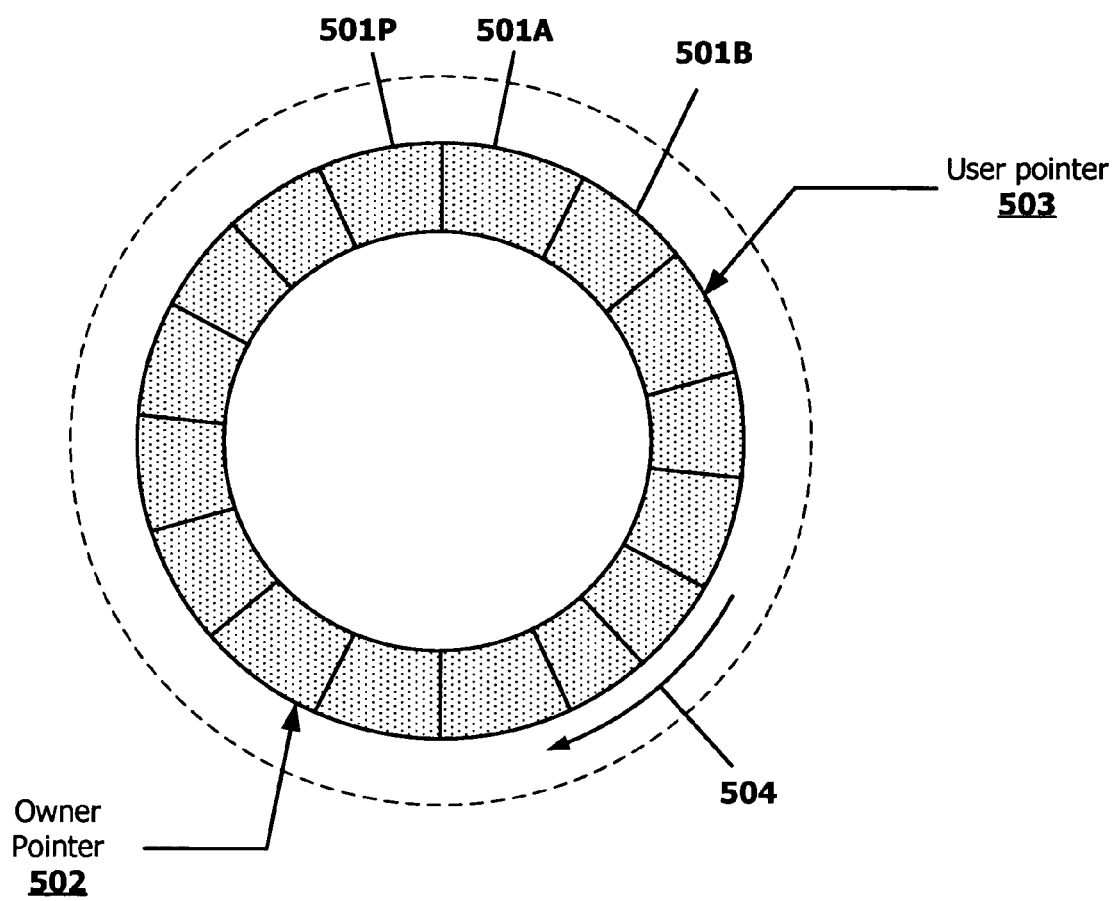
FIG. 5 illustrates an embodiment of the present invention of a graphical representation of a data communication connector.

As stated in the Background Information section, an architecture and technique has been developed that allows tasks to communicate with other tasks within a single DSP processor core. Each task may communicate with another task such as acquiring information from that task in order to perform its operation. In such an architecture, each task may have a data structure associated with it, referred to as an inter task control block, used to store status and control information. Each inter task control block may be capable of transmitting its status and control information to another inter task control block thereby allowing each task the ability to communicate its status and control information to another task. Further, in such an architecture, data necessary to perform an operation may be transmitted from one task to another task by a stream connector. However, this architecture is limited to tasks communicating with another task in a single DSP. By limiting such communication to a single DSP, DSP systems may be forced to implement a single DSP processor core instead of implementing multiple DSP processor cores. By limiting a system to implementing a single DSP processor core, the system may not have enough processing power to handle the number of necessary calculations to be made. Therefore, there is a need in the art to facilitate inter-DSP data communications between software tasks located in separate DSP processor cores in a DSP complex. Inter-DSP data communications may be facilitated between software tasks located in separate DSP processor cores in a DSP complex using the architecture and process as explained below in association with FIGS. 6-16. Prior to such a discussion, a discussion of software tasks being executed by a DSP processor core 302 is deemed appropriate. FIG. 4 illustrates an embodiment of the present invention of multiple software tasks interacting with one another via data communication connectors. FIG. 5 illustrates an embodiment of the present invention of a graphical representation of a data communication connector.

FIG. 4—Interaction of Software Tasks

FIG. 4 illustrates an embodiment of the present invention of multiple software tasks 401A-C interacting with one another via data communication connectors 402A-D. Software tasks 401A-C may collectively or individually be referred to as software tasks 401 or software task 401, respectively. Data communication connectors 402A-D may collectively or individually be referred to as data communication connectors 402 or data communication connector 402, respectively. A software task 401 may refer to code and data segments that are to executed by DSP processor core 302. A data communication connector 402 may be configured to pass data between tasks 401. Each software task 401 may include a data structure, referred to herein as a "inter-task control block (ITCB)," configured to store status and control information. For example, task 401A may include ITCB 403A. Similarly, task 401B may include ITCB 403B and task 401C may include ITCB 403C. ITCB's 403A-C may collectively or individually be referred to as ITCB's 403 or ITCB 403, respectively. The status and control information may be communicated with another task 401 in a separate path (not shown) that directly links one ITCB 403 in one task 401 to another ITCB 403 in another task 401. An example of the interaction of software tasks 401 is provided below.

In one example, an audio signal from telephone line 107 (FIG. 1) may be sampled and converted into a digital format by A/D converter 207 (FIG. 2). The signal representation of the digital signal may be converted to a frequency representation of the signal by performing a fast fourier transform (fft) on the digital signal by task 1 401A. The digital signal from A/D converter 207 may be transmitted to task 1 401A via data communication connector 402A. The output of task 1 401A may be transmitted to task 2 401B via data communication connector 402B to alter the digital signal's acoustic frequency response according to the settings of a graphics equalizer. Task 2 401B may receive the current settings of a graphics equalizer from processor 202 (FIG. 2). The settings may be adjusted by task 2 401B using the fft output of task 1 401A. The output of task 2 401B may be forwarded to task 3 401C via data communication connector 402C to be converted into the time domain by task 3 401C performing the inverse fast fourier transform (ifft) on the output of task 2 401B. The output of task 3 401C may then be transmitted to D/A converter 207 via data communication connector 402D to be converted into an analog signal which may then be amplified by an amplifier (not shown). It is noted that the above is an example of how software tasks 401 interrelate with one another and that software tasks 401 may be configured to perform other tasks than illustrated. Additional details regarding the interaction of software tasks 401 are disclosed in U.S. Pat. No. 5,625,845, entitled "System for Facilitating Continuous, Real-Time, Unidirectional, and Asynchronous Intertask and End-Device Communication in a Multimedia Data Processing System Using Open Architecture Data Communication Modules," which is hereby incorporated herein by reference in its entirety. A graphical representation of data communication connector 402 is provided below.

FIG. 5—Data Communication Connector

FIG. 5 illustrates an embodiment of the present invention of a graphical representation of data communication connector 402 (FIG. 4). Data communication connector 402 may be represented as a circular memory buffer divided into a plurality of memory segments 501A-P. Memory segments 501A-P may collectively or individually be referred to as memory segments 501 or memory segment 501, respectively. It is noted that data communication connector 402 may include any number of memory segments 501 and that FIG. 5 is illustrative.

Referring to FIG. 5, circular memory buffer 402 may be used to pass data streams between two or more software tasks 401 (FIG. 4) or between a software task 401 and a device, e.g., A/D converter 207. Each memory segment 501 in memory buffer 402 may be composed of a plurality of bytes or words. Memory segments 501 which have data in them are depicted as shaded, while memory segments 501 which have no new data stored therein are depicted in un-shaded form.

In order to ensure an orderly communication of real-time and/or asynchronous data, one task 401 may be designated as the "owner" of any particular data communication connector 402. A data communication connector 402 may have only one owner. The owner is the only task 401 which is allowed to write to the data communication connector circular memory array 402. The owner task 401 controls an owner pointer 502 (or "write pointer") which identifies the last memory segment 501 into which data has been written. One or more software tasks 401 is, or are, identified as the "user" of a data communication connector 402. The "user" task 401 or end device controls a user pointer 503 (or "read pointer") which identifies the last memory segment 501 in the circular memory 402 from which data has been read. Before an owner task 401 writes data to circular memory array 402, owner pointer 502 is incremented to identify the next consecutive memory segment 501 in the circular memory array 402. Before a user task 401 reads data from circular memory array 402, user pointer 503 is likewise incremented to identify the next memory segment 501 in circular memory array 402 which is to be read. Data is read from and written to circular memory array 402 in only one direction, which is graphically depicted by arrow 504. Additional details regarding data communication connector 402 regarding the interaction of software tasks 401 are disclosed in U.S. Pat. No. 5,625,845, entitled "System for Facilitating Continuous, Real-Time, Unidirectional, and Asynchronous Intertask and End-Device Communication in a Multimedia Data Processing System Using Open Architecture Data Communication Modules," which is hereby incorporated herein by reference in its entirety.

As stated above, there is a need in the art to facilitate inter-DSP data communications between software tasks located in separate DSP processor cores in a DSP complex. Inter-DSP data communications may be facilitated between software tasks located in separate DSP processor cores in a DSP complex using the architecture described below in association with FIG. 6.

Figure 6:
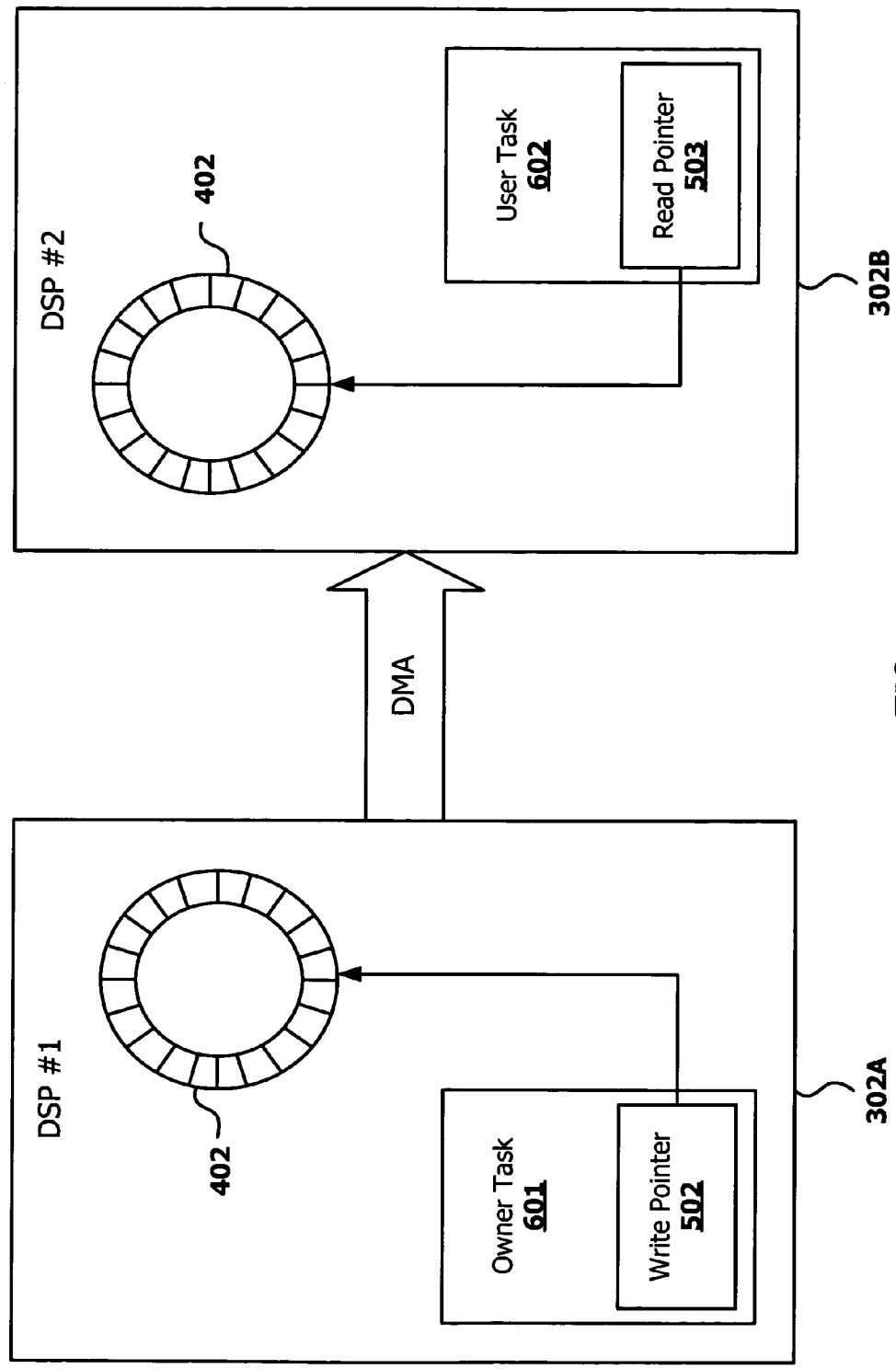
FIG. 6 illustrates an embodiment of the present invention of an architecture for facilitating inter-DSP data communications between software tasks located in separate DSP processor cores.

FIG. 6—Architecture for Facilitating Inter-DSP Data Communications Between Software Tasks Located in Separate DSP Processor Cores FIG. 6 illustrates an embodiment of the present invention of an architecture for facilitating inter-DSP data communications between software tasks 401 located in separated DSP processor cores 302.

Referring to FIG. 6, each DSP processor core 302, e.g., DSP processor cores 302A-B, contains a circular buffer 402. For example, DSP processor core 302A contains a circular buffer 402 residing in its own local memory. DSP processor core 302B also contains a circular buffer 402 residing in its local memory. Further, DSP processor core 302A may contain an owner task 601. DSP processor core 302 that contains an owner task (as discussed above) may be referred to herein as the "owner DSP processor core 302." Circular buffer 402 contained within the owner DSP processor 302 may be referred to herein as the "source circular buffer 402." Further, DSP processor core 302B may contain a user task 602 (as discussed above). DSP processor core 302 that contains a user task may be referred to herein as the "user DSP processor core 302." Circular buffer 402 contained within the user DSP processor 302 may be referred to herein as the "destination circular buffer 402." It is noted that any DSP processor core 302 may be an owner DSP processor core 302 and that any DSP processor core 302 may be a user DSP processor core 302. It is further noted that designating DSP processor core 302A as the owner DSP processor core 302 and designating DSP processor core 302B as the user DSP processor core 302 is for illustrative purposes.

Owner task 601 may be configured to write to circular buffer 402 in DSP processor core 302A using a write pointer 502 (FIG. 5). Owner task 601 is a software task 401 represented as a data structure containing write pointer 502. Similarly, user task 602 may be configured to read from circular buffer 402 in DSP processor core 302B using a read pointer 503 (FIG. 5). Read task 602 is a software task 401 represented as a data structure containing read pointer 503.

In the embodiments disclosed in U.S. Pat. No. 5,625,845, the user task 602 was able to directly access the circular buffer 402 in DSP processor core 302A. However, in the embodiments containing software tasks 401 located in separated DSP processor cores 302, the user task 602 cannot directly access the circular buffer 402 located in the owner DSP processor core 302A . Hence, the user DSP processor core 302B needs to contain a second image circular buffer 402 residing in its local memory as illustrated in FIG. 6. That is, the user DSP processor core 302B needs to contain a circular buffer 402 that is an image of the circular buffer 402 in the owner DSP processor core 302A. It is noted that in some embodiments, the circular buffers 402 in the owner and user DSP processor cores 302A-B may be different sizes.

Data from the local memory of the owner DSP processor core 302A may be transferred to the local memory of the user DSP processor core 302B by DMA controller 204 (FIGS. 2 and 3) over bus 301 (FIG. 3) using various protocols as described further below in association with FIGS. 8-16. It is noted that data transfers by DMA controller 204 is referred to herein as "DMA data movements." All data movement between the owner DSP processor core 302A and the user DSP processor core 302B (FIG. 6 only depicts one data movement) may be represented by a data structure, referred to herein as a "buffer descriptor block," as described below in association with FIG. 7. The buffer descriptor block may be used to identify the data to be moved from one DSP processor core 302 and the location of where to move the data in another DSP processor core 302. A more detail description of the movement of data is described further below in association with FIGS. 8-16.

Figure 7:
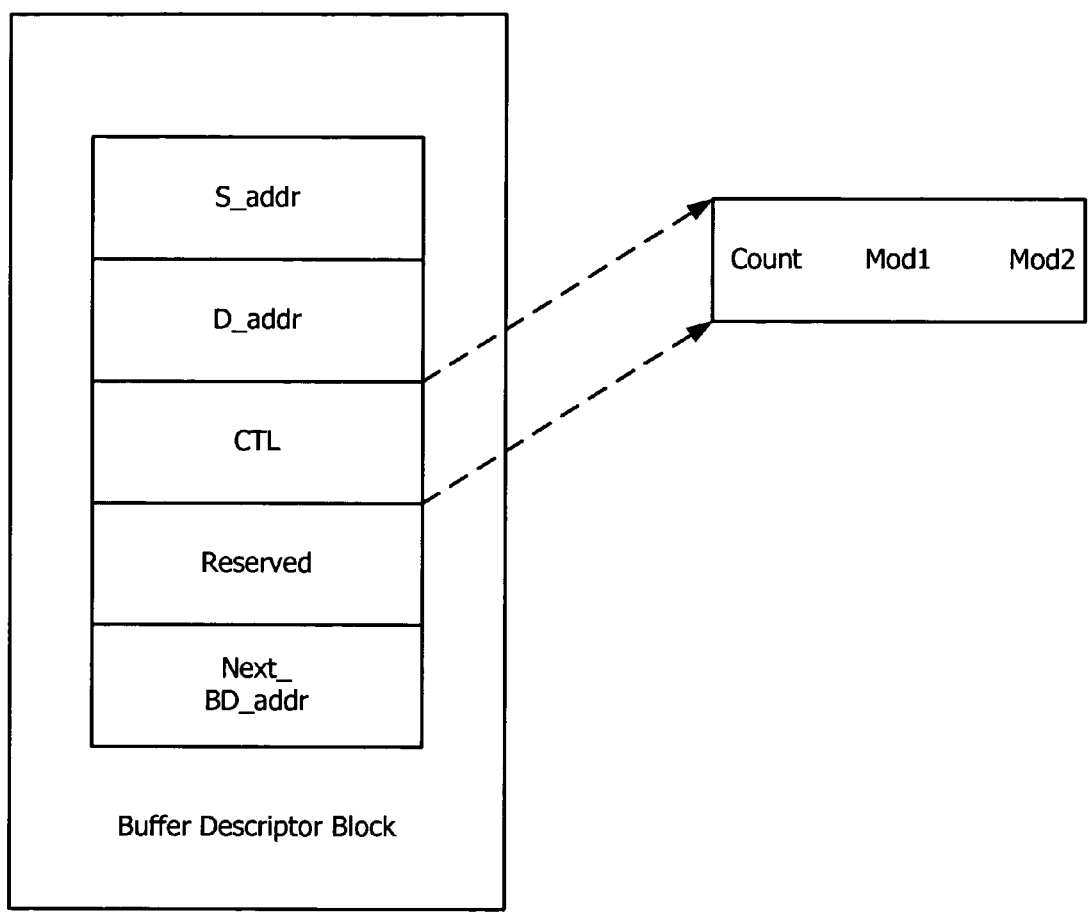
FIG. 7 illustrates an embodiment of the present invention of a buffer descriptor block.

FIG. 7—Buffer Descriptor Block

FIG. 7 illustrates an embodiment of the present invention of a buffer descriptor block 700. Buffer descriptor block 700 may comprise an entry in its data structure storing the source address, identified by "S_addr," which identifies a global address in system or global memory address space which can be seen as a concatenation of all DSP core's (and hardwired elements) local data memory 308A-G (FIG. 3). The global address in the system memory map may correspond to an address in the local memory of a DSP processor core 302. The source address identifies the originating address of the block of data to be moved by DMA controller 204 from the local memory of one DSP processor core 302 to another DSP processor core 302.

Buffer descriptor block 700 may further comprise an entry storing the destination address, identified by "D_addr," which identifies a local address in a DSP processor core 302, e.g., DSP processor core 302B. The destination address identifies the local address in a DSP processor core 302, e.g., DSP processor core 302B, to contain the block of data to be moved.

Buffer descriptor block 700 may further comprise an entry storing control information, identified by "CTL," which includes information as to the number of bytes or words of the data to be moved by DMA controller 204, as identified by "COUNT." The control information may further include information as to the number of memory segments 501 (FIG. 5) of the circular buffer 402 in the owner DSP processor core 302, as identified by "MOD1," and the number of memory segments 501 of the circular buffer 402 in the user DSP processor core 302, as identified by "MOD2." The information provided by MOD1 and MOD2 may be important as the size of the circular buffers 402 in the owner DSP processor core 302 and in the user DSP processor core 302 may be different. DMA controller's 204 hardware may advance the source and destination address during data transfers using MOD1 arithmetic on the global source address and MOD2 arithmetic on the global destination address.

Buffer descriptor block 700 may further comprise an entry reserved for future use.

Buffer descriptor 700 may further comprise an entry, referred to as the "next buffer descriptor address field (Next_BD_addr)," comprising a pointer to the next buffer descriptor block 700 used in the transferring of data from one DSP processor core 302A to another DSP processor core 302B. Buffer descriptor blocks 700 may be chained together if there are multiple DMA data movements as discussed below in association with FIG. 16.

Figure 16:
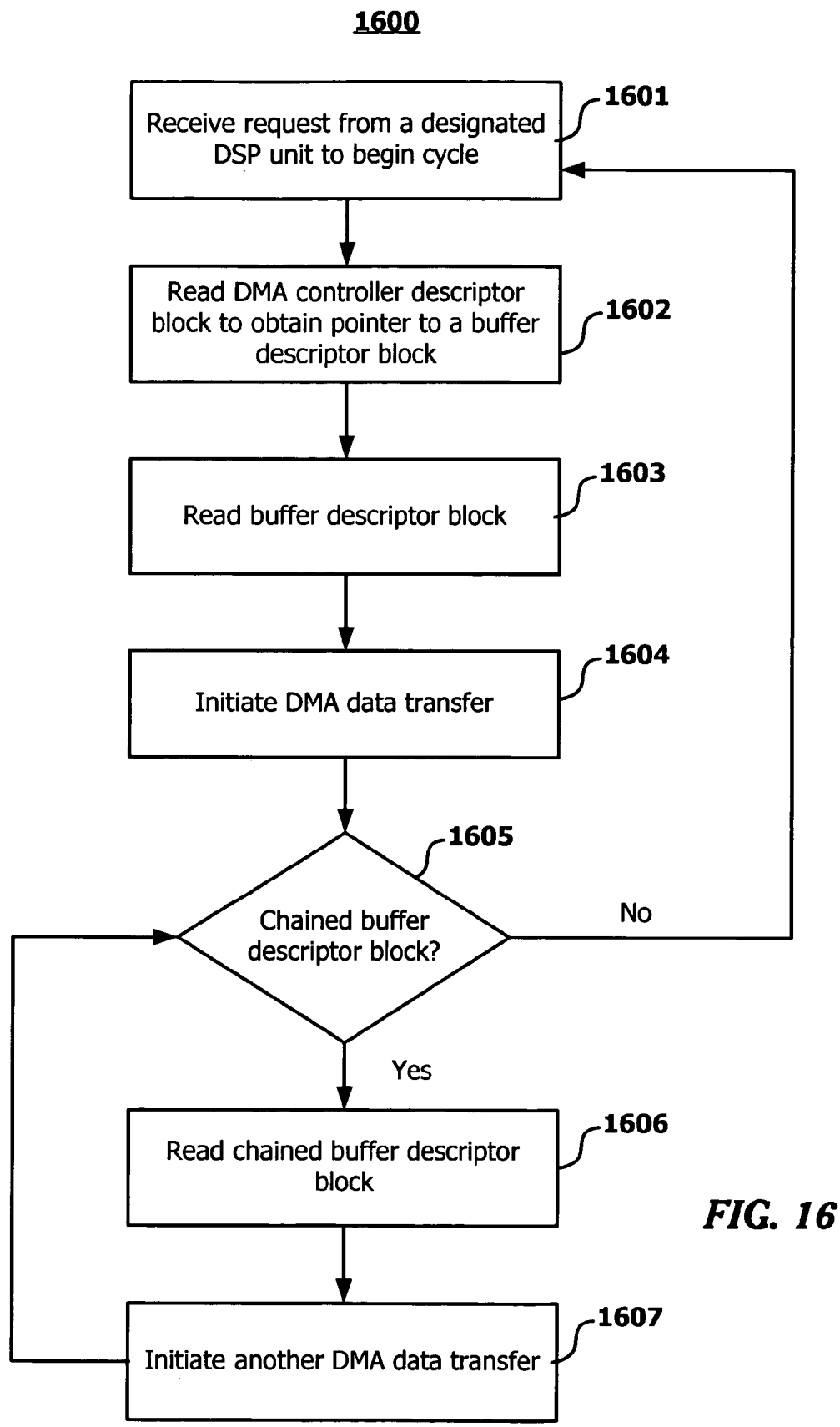
FIG. 16 is a flowchart of a method for buffer descriptor blocks during multiple DMA data movements in accordance with an embodiment of the present invention.

FIG. 16—Flowchart of Chaining Buffer Descriptor Blocks

FIG. 16 illustrates an embodiment of the present invention of a method 1600 for chaining buffer descriptor blocks 700 during multiple DMA data movements. Referring to FIG. 16, in conjunction with FIGS. 1-7, in step 1601, DMA controller 204 receives a request from a DSP processor core 302, e.g., DSP processor core 302A, to begin a cycle of transferring data from one DSP processor core 302, e.g., DSP processor core 302A, to another DSP processor core 302, e.g., DSP processor core 302B. A cycle, e.g., 30 µs, may refer to a maximum allowable length of time to complete all of the data movements involved in the entire DSP complex from all new data generated in the past interval, e.g., 30 µs. This interval may be referred to herein as the system "heart beat." In one embodiment, the heart beat may never change and may be systematically cycled every cycle, e.g., 30 µs, regardless of how much or how little data (can be zero data) has been generated within DSP complex 203.

In step 1602, DMA controller 204 reads a data structure, referred to herein as a "DMA controller descriptor block," to obtain a pointer that points to a buffer descriptor block 700. The DMA controller descriptor block may refer to a data structure used to store information to be used by DMA controller 204.

In step 1603, DMA controller 204 reads the buffer descriptor block 700 identified by the pointer obtained in step 1602.

In step 1604, DMA controller 204 initiates a DMA data transfer using the information obtained from the buffer descriptor 700 read in step 1603. A more detailed description of the different types of DMA data transfers is provided further below in association with FIGS. 8-15.

In step 1605, DMA controller 204 determines if there is a buffer descriptor block 700 chained to the previous buffer descriptor block 700 read. In one embodiment, DMA controller 204 may determine if there is a chained buffer descriptor block 700 by reading the next buffer descriptor address field in buffer descriptor block 700.

If there is not another DMA data transfer involved in the request received in step 1601, then the entry in block descriptor block 700 that identifies the address of the next block descriptor block 700 would be null. DMA controller 204 may then wait until it receives another request in step 1601 from a DSP processor core 302, e.g., DSP processor core 302A, to begin another cycle of transferring data to be moved within DSP complex 203. For example, DMA controller 204, as one of its data movements to be performed, may transfer data from one DSP processor core 302, e.g., DSP processor core 302A, to another DSP processor core 302, e.g., DSP processor core 302B.

If there is a pointer to another buffer descriptor block 700 in the next buffer descriptor address field in buffer descriptor block 700, then, in step 1606, DMA controller 204 reads the chained buffer descriptor block 700 identified by the pointer obtained from the next buffer descriptor address. In step 1607, DMA controller 204 initiates another DMA data transfer using the information obtained from the buffer descriptor 700 read in step 1606. DMA controller 204 then determines, in step 1605, if there is a buffer descriptor block 700 chained to the previous buffer descriptor block 700 read.

It is noted that method 1600 may include other and/or additional steps that, for clarity, are not depicted. It is further noted that method 1600 may be executed in a different order presented and that the order presented in the discussion of FIG. 16 is illustrative. It is further noted that certain steps in method 1600 may be executed in a substantially simultaneous manner.

As stated above, buffer descriptor block 700 may be chained together if there are multiple DMA data movements. Multiple DMA data movements may occur as illustrated below in the discussion of standardized communication protocols. Each DMA data movement request may need a pair of DMA movements chained together. One DMA data movement may refer to the movement of data from the local memory of the owner DSP processor core 302 to the local memory of the user DSP processor core 302. The other DMA data movement may refer to the movement of a copy of a pointer from the local memory of the owner/user DSP processor core 302 to the local memory of the user/owner DSP processor core 302.

In one embodiment, there are four standard communication protocols involved in the transfer of data between software tasks. The four types of communication protocols are the following: synchronous protocol, owner data driven protocol, user data driven protocol and safe data driven protocol. A summary of each is provided below.

In the synchronous protocol, the owner task writes to the circular buffer at a constant rate and the user task reads the data at the same rate. Both tasks may run open-loop with no checking of empty/full buffer conditions. Both tasks are assured to generate and consume data at identical rates by program design. Initial synchronization of write and read pointers is beyond the scope of this disclosure for the synchronous protocol, but can be facilitated by creating additional intermediate tasks that use the owner, user and safe data driven protocols to move data securely between DSP processor cores 302 over bus 301. Further, both tasks do not know the position of the other tasks' pointer, e.g., read/write pointer.

In the owner data driven protocol, the owner task writes to the circular buffer at its own rate. The user task is expected to keep up with the owner task and consume all the data that is produced. The owner task runs at open-loop but the user task has the responsibility of checking empty/full buffer conditions. They are assured to generate and consume data at identical rates by program design. Initial synchronization of write and read pointers may be accomplished by setting the read pointer equal to the write pointer, indicating an empty buffer condition.

In the user data driven protocol, the user task reads from the circular buffer at its own rate. The owner task is expected to match the user task's rate and always keep enough data in the circular buffer. The owner task has knowledge of the position of the user task's pointer and is responsible for checking empty/full buffer conditions.

In the safe data driven protocol, both owner and user tasks actively prevent pointer overrun. Both owner and user tasks know the position of the other task's pointer. The owner task does not write data in the circular buffer if the circular buffer is full and the user task does not read data from in the circular buffer if the circular buffer is empty.

Figure 8:
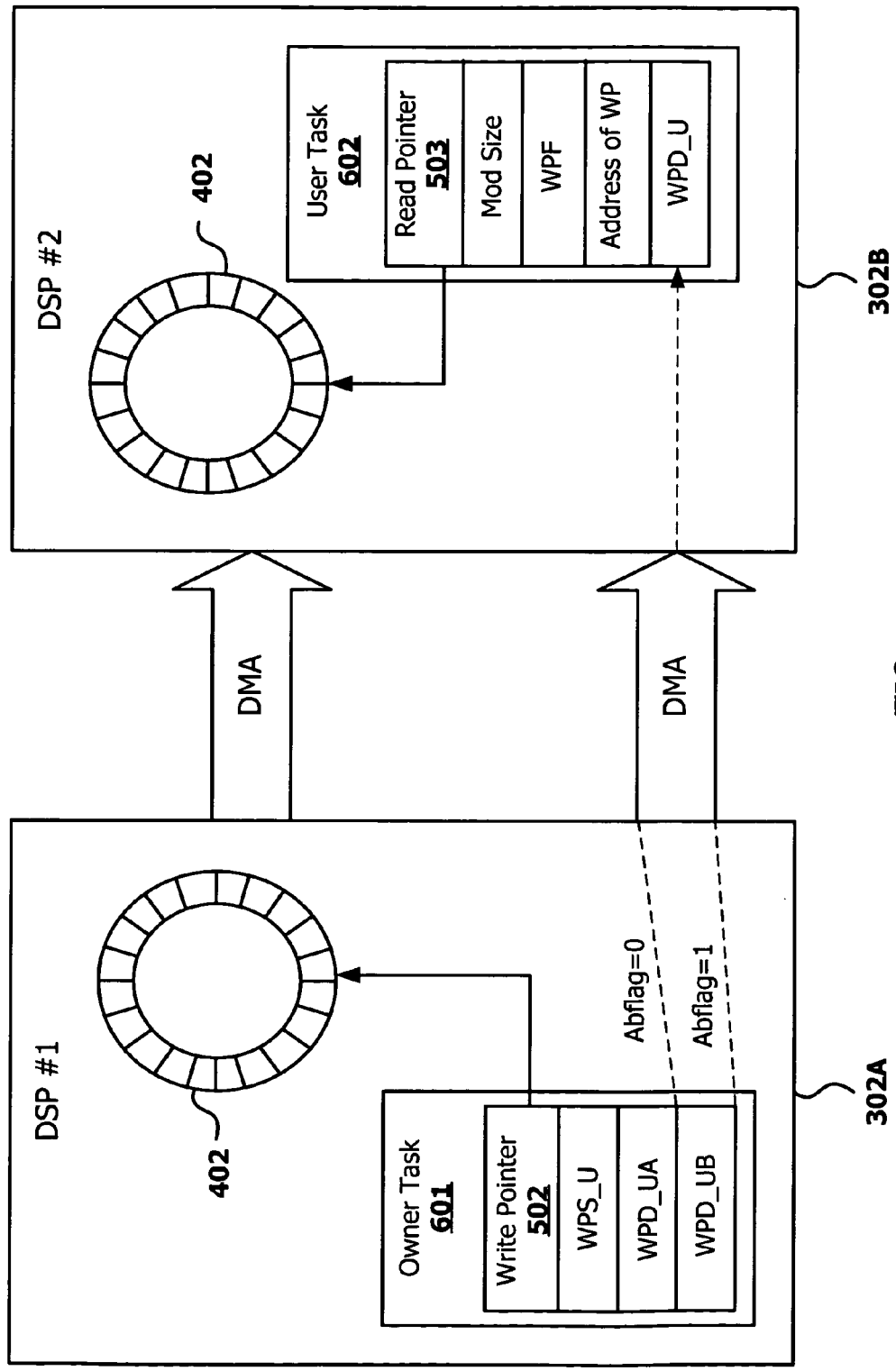
FIG. 8 illustrates an embodiment of the present invention of an architecture for facilitating inter-DSP data communications for an owner data driven protocol.
Figure 9:
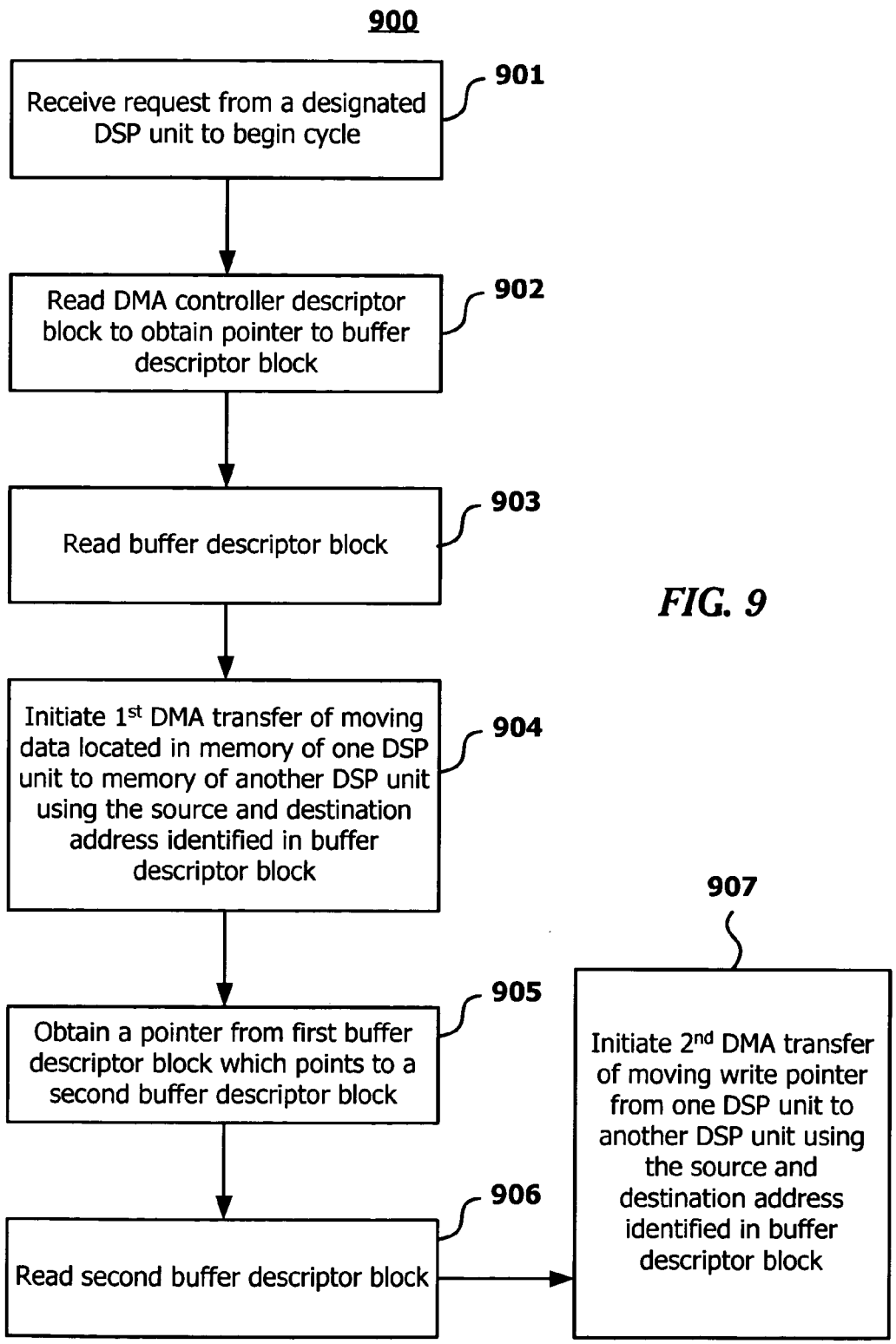
FIG. 9 is a flowchart of a method for facilitating inter-DSP data communications for the owner data driven protocol in accordance with an embodiment of the present invention.
Figure 11:
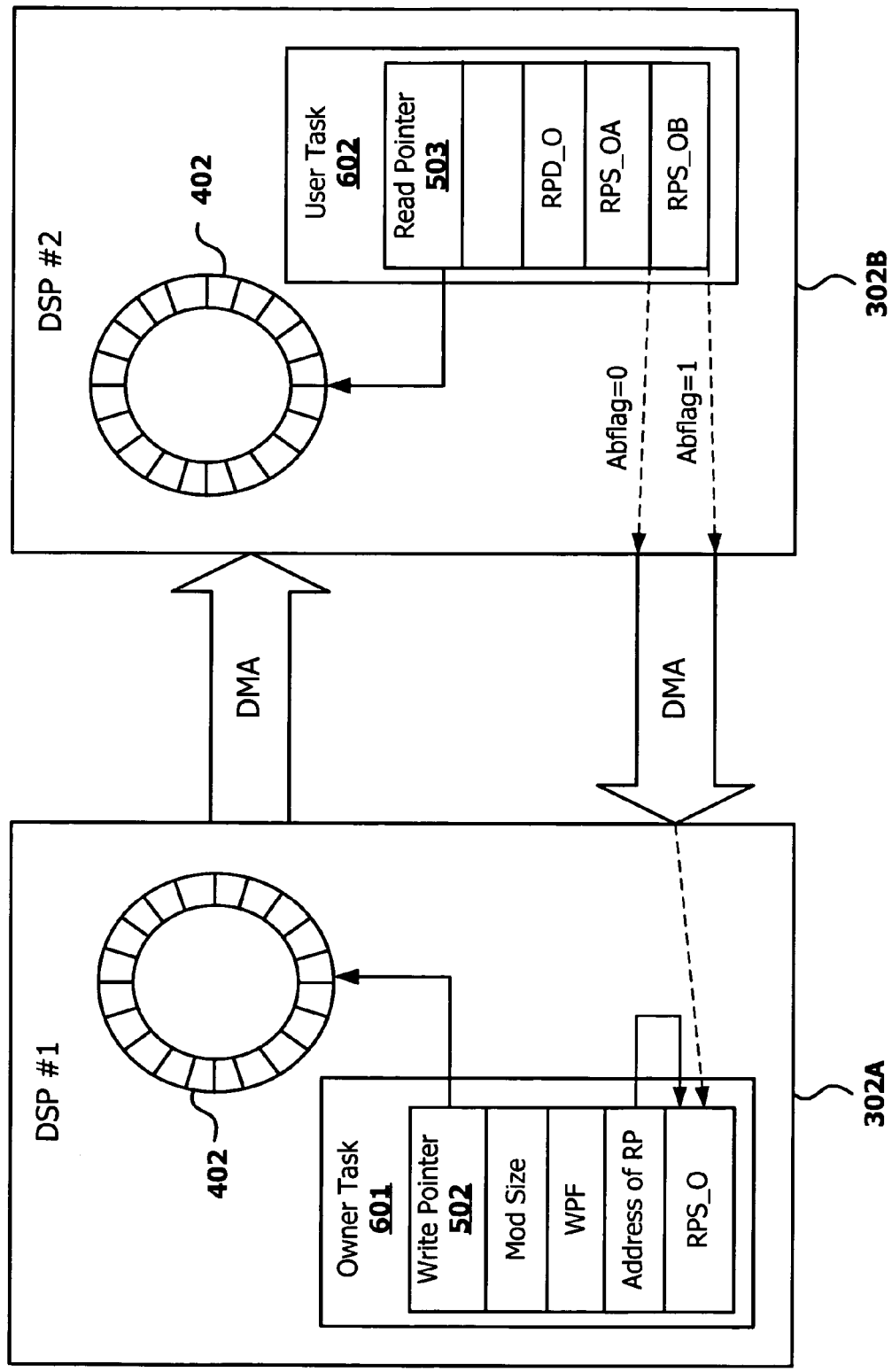
FIG. 11 illustrates an embodiment of the present invention of an architecture for facilitating inter-DSP data communications for a user data driven protocol.
Figure 12:
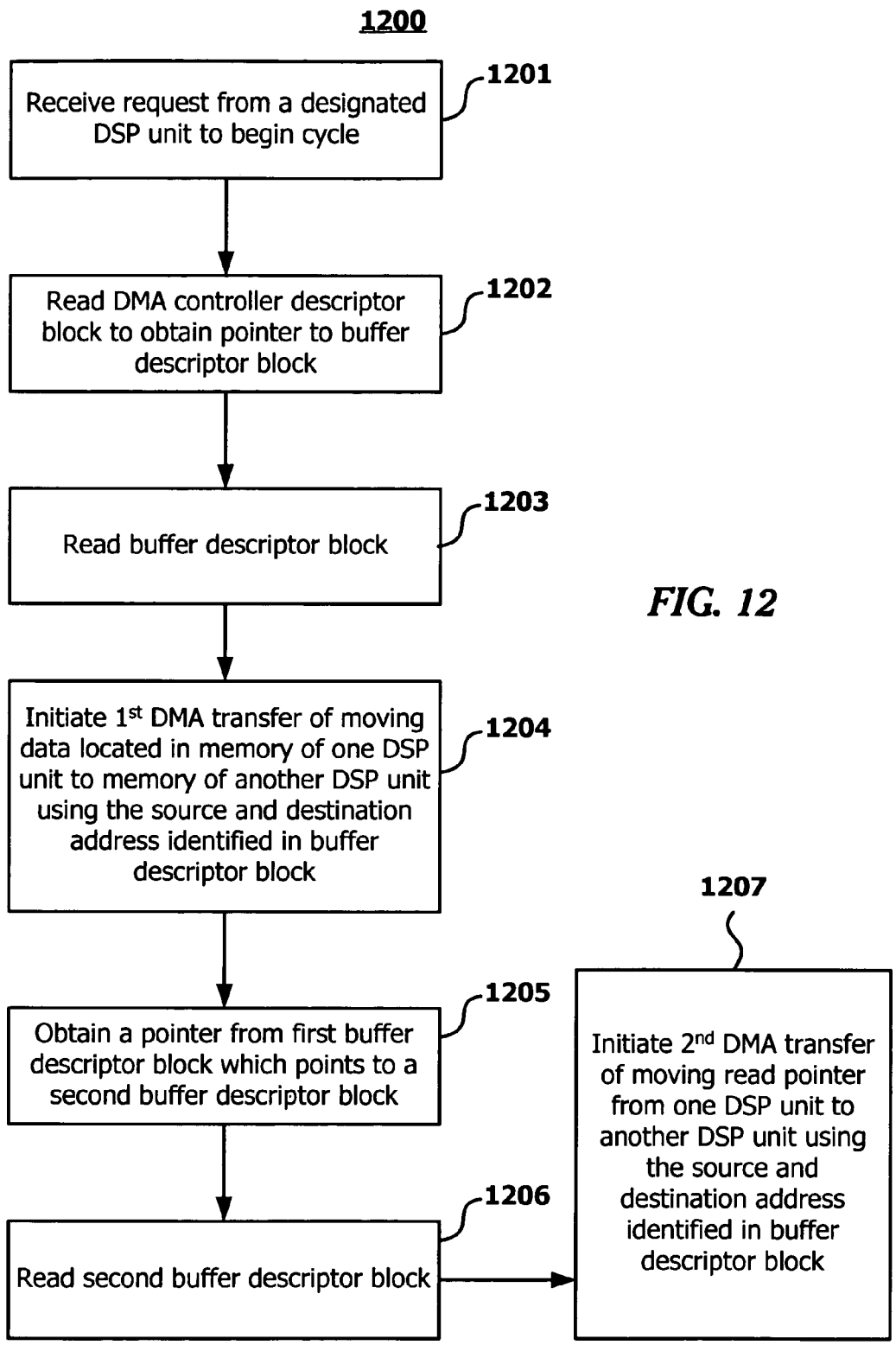
FIG. 12 is a flowchart of a method for facilitating inter-DSP data communications for the user data driven protocol in accordance with an embodiment of the present invention.
Figure 14:
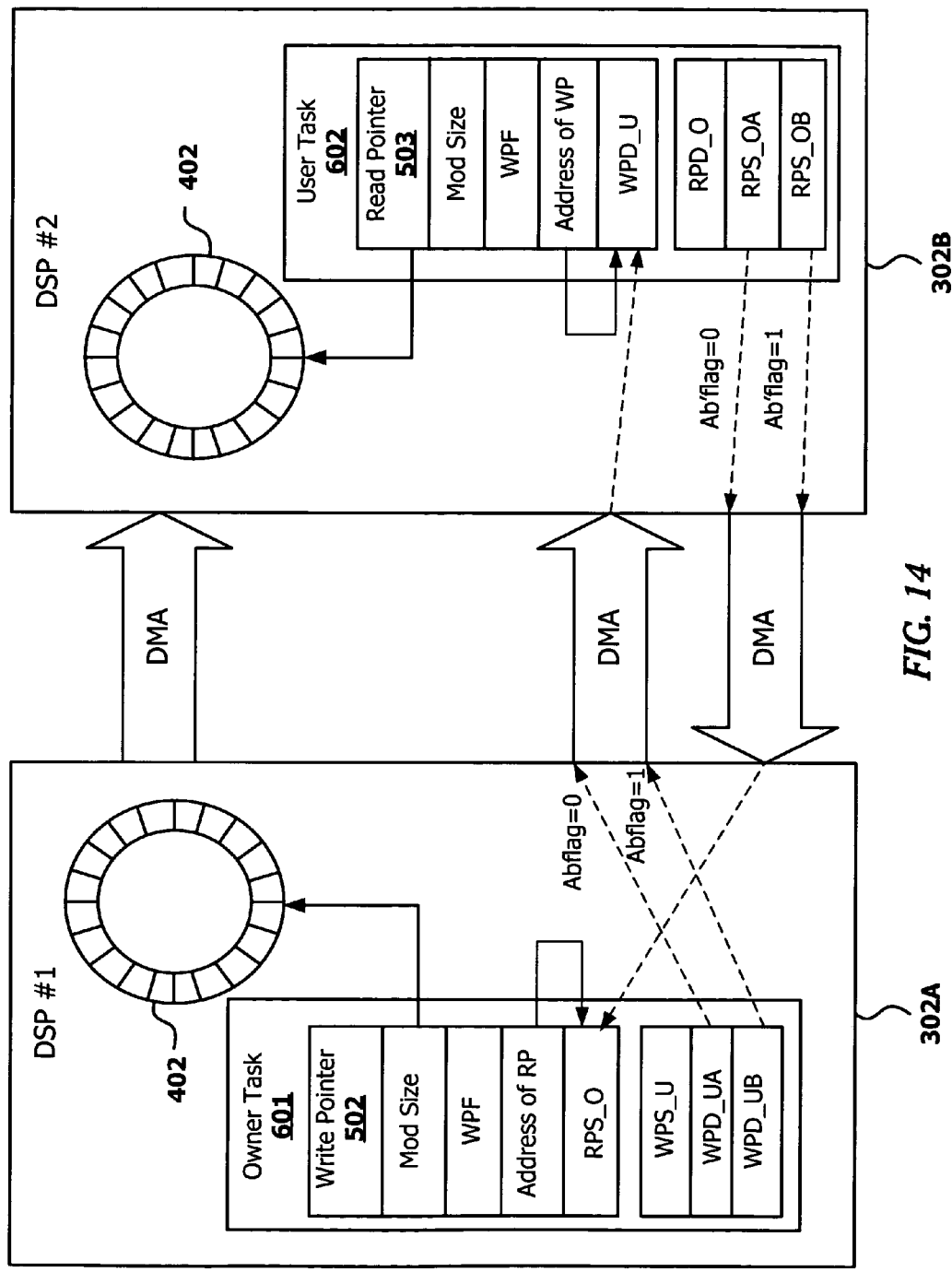
FIG. 14 illustrates an embodiment of the present invention of an architecture for facilitating inter-DSP data communications for a safe data driven protocol.
Figure 15:
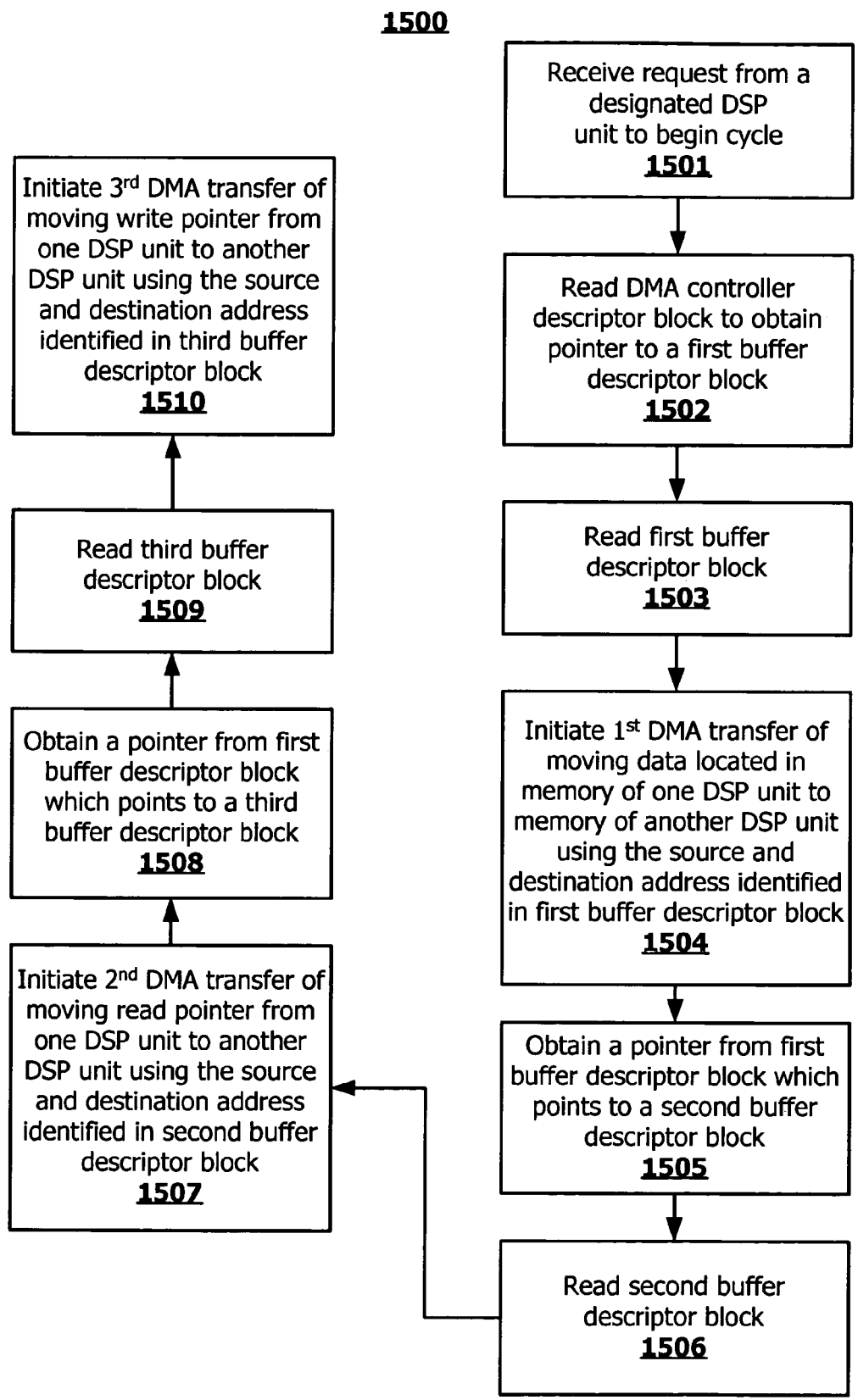
FIG. 15 is a flowchart of a method for facilitating inter-DSP data communications for the safe data driven protocol in accordance with an embodiment of the present invention.

Additional details regarding the four standard communication protocols are disclosed in U.S. Pat. No. 5,625,845, entitled "System for Facilitating Continuous, Real-Time, Unidirectional, and Asynchronous Intertask and End-Device Communication in a Multimedia Data Processing System Using Open Architecture Data Communication Modules," which is hereby incorporated herein by reference in its entirety. Three of the four standard communication protocols (owner data driven protocol, user data driven protocol and safe data driven protocol) used in conjunction with the architecture of facilitating inter-DSP data communications between software tasks 401 located in separated DSP processor cores 302 is described below in association with FIGS. 8-15. FIGS. 8-10 illustrate facilitating inter-DSP data communications for the owner data driven protocol. FIGS. 11-13 illustrate facilitating inter-DSP data communications for the user data driven protocol. FIGS. 14-15 illustrate facilitating inter-DSP data communications for the safe data driven protocol.

FIG. 8—Architecture to Facilitate Inter-DSP Data Communications for Owner Data Driven Protocol FIG. 8 illustrates an embodiment of the present invention of an architecture for facilitating inter-DSP data communications for the owner data driven protocol.

Referring to FIG. 8, owner task 601 in the owner DSP processor core 302, e.g., DSP processor core 302A, may contain an entry in its data structure to store an address of write pointer 502 (FIG. 5) as well as an entry to store the latest copy of the address of write pointer 502, as indicated by "WPS_U." As stated above, the owner and user DSP processor cores 302 may contain a different modulo buffer size and hence the WPS_U value may have to be converted to point to the appropriate address in the user DSP processor core 302. This converted address may be stored in either the entry indicated as WPD_UA or WPD_UB in the owner task 601.

User task 602 in the user DSP processor core 302, e.g., DSP processor core 302B, may contain an entry in its data structure to store an address of read pointer 503 (FIG. 5). User task 602 may further contain an entry in its data structure storing an indication of the size of its circular buffer 402, as identified by "Mod Size." User task 602 may further contain an entry in its data structure storing an indication as to the maximum number of words read in a period of time by the user DSP processor core 302, as identified by "WPF." User task 602 may further contain an entry, as identified by "Address of WP," in its data structure storing an address of the write pointer. User task 602 may further contain an entry, as identified by "WPD_U", in its data structure storing the actual copy of the write pointer received from owner task 601 from location WPD_UA or WPD_UB in owner task 601 using DMA controller 204. The particular entry, WPD_UA or WPD_UB, may be selected by DMA controller 204 based on state of a flag, referred to herein as the "ABflag," as discussed in greater detail further below.

In the owner data driven protocol, there are two DMA data movements as explained below in association with FIG. 9.

FIG. 9—Method for Facilitating Inter-DSP Data Communications for Owner Data Driven Protocol FIG. 9 is a flowchart of an embodiment of the present invention of a method 900 for facilitating inter-DSP communications for the owner data driven protocol.

Referring to FIG. 9, in conjunction with FIGS. 1-8, in step 901, DMA controller 204 receives a request from a DSP processor core 302, e.g., DSP processor core 302A, to begin a cycle of transferring data from one DSP processor core 302, e.g., DSP processor core 302A, to another DSP processor core 302, e.g., DSP processor core 302B. A cycle, e.g., 30 µs, may refer to a length of time to complete a transfer of data movements involved in a single request from a DSP processor core.

In step 902, DMA controller 204 reads a data structure, referred to herein as a "DMA controller descriptor block," to obtain a pointer that points to a buffer descriptor block 700. The DMA controller descriptor block may refer to a data structure used to store information to be used by DMA controller 204.

In the illustrative embodiment, steps 901 and 902 may not be executed except for the first buffer descriptor 700 found in the first DSP processor core's data memory 308 which begins the chain of buffer descriptors 700. Normally, one would begin at step 903 as DMA controller 204 loads the chained list of buffer descriptors 700 which may outline many DMA transfers to be carried out in the given system heart beat.

In step 903, DMA controller 204 reads the buffer descriptor block 700 identified by the pointer obtained in step 902. As stated above, buffer descriptor block 700 may contain, in the entry identified by "S_addr," a source address used to identify a global address in system memory address space. This source address corresponds to a local address in the local memory of the owner DSP processor core 302, e.g., DSP processor core 302A. In particular, this source address corresponds to the local address in a memory segment 501 in the circular buffer 402 that is a particular number of bytes or words, as identified by the entry COUNT, behind the memory segment 501 identified by write pointer 502. Buffer descriptor block 700 may further contain, in the entry identified by "COUNT," information as to a length of a block of memory, i.e., a number of bytes or words of the data. Buffer descriptor block 700 may further contain, in the entry identified by "D_addr," a destination address used to identify a local address in the user DSP processor core 302, e.g., DSP processor core 302B.

In step 904, DMA controller 204 initiates a first DMA transfer of moving data from the source address in the circular buffer 402 of the owner DSP processor core 302 to the destination address in the circular buffer 402 of the user DSP processor core 302. The size of the transfer corresponds to the number of bytes as indicated in the COUNT entry in the buffer descriptor block 700 read in step 903.

In step 905, DMA controller 204 obtains a pointer from buffer descriptor block 700 read in step 903 to identify a second buffer descriptor block 700. As stated above, buffer descriptor block 700 may contain an entry that stores a pointer to another block descriptor block 700 if there is another DMA data transfer involved in the request received in step 901. If there is not another DMA data transfer involved in the request received in step 901, then the entry in block descriptor block 700 that identifies the address of the next block descriptor block 700 would be null. DMA controller 204 may then wait until it receives another request from a DSP processor core 302, e.g., DSP processor core 302A, to begin another cycle of transferring data from one DSP processor core 302, e.g., DSP processor core 302A, to another DSP processor core 302, e.g., DSP processor core 302B.

In step 906, DMA controller 204 reads block descriptor block 700 identified in step 905. As stated above, buffer descriptor block 700 may contain, in the entry identified by "S_addr," a source address used to identify a global address in system memory address space. This source address corresponds to a local address in the local memory of DSP processor core 302, e.g., DSP processor core 302A. For example, this source address corresponds to a local address in the local memory of the owner DSP processor core 302. In particular, this source address corresponds to the local address in the local memory of the owner DSP processor core 302 that may either be WPD_UA or WPD_UB, based on the ABflag state. Buffer descriptor block 700 may further contain, in the entry identified by "D_addr," a destination address used to identify a local address in the user DSP processor core 302, e.g., DSP processor core 302B, of the user DSP address of WPD_U.

In step 907, DMA controller 204 initiates a second DMA transfer of moving the current contents of WPD_UA or WPD_UB data from the source address the owner DSP processor core 302 (corresponds to the local address in the local memory of the owner DSP processor core 302 that may either be WPD_UA or WPD_UB) to the destination address of the user DSP processor core 302 (corresponds to the local address in the local memory of the user DSP processor core 302 that stores write pointer 502). It is noted that the background task, as discussed below in association with FIGS. 10A & 10B, writes to either WPD_UA or WPD_UB in a given heartbeat where DMA controller 204 is accessing the other value. For example, the background task writes to WPD_UA if DMA controller 204 in that same heart beat window is going to read WPD_UB. Similarly, the background task writes to WPD_UB if DMA controller 204 in that same heart beat window is going to read WPD_UA. In one embodiment, a flag, referred to herein as the "ABflag," toggles between 0 and 1 which can be used by the background task to assure synchronization such that the background task may not attempt to write to the same WPD_U value that DMA controller 204 is accessing in the same heartbeat.

It is noted that method 900 may include other and/or additional steps that, for clarity, are not depicted. It is further noted that method 900 may be executed in a different order presented and that the order presented in the discussion of FIG. 9 is illustrative. It is further noted that certain steps in method 900 may be executed in a substantially simultaneous manner.

During the owner data driven protocol, a background process may occur in the owner DSP processor core 302 as described below in association with FIGS. 10A & 10B.

Figure 10A:
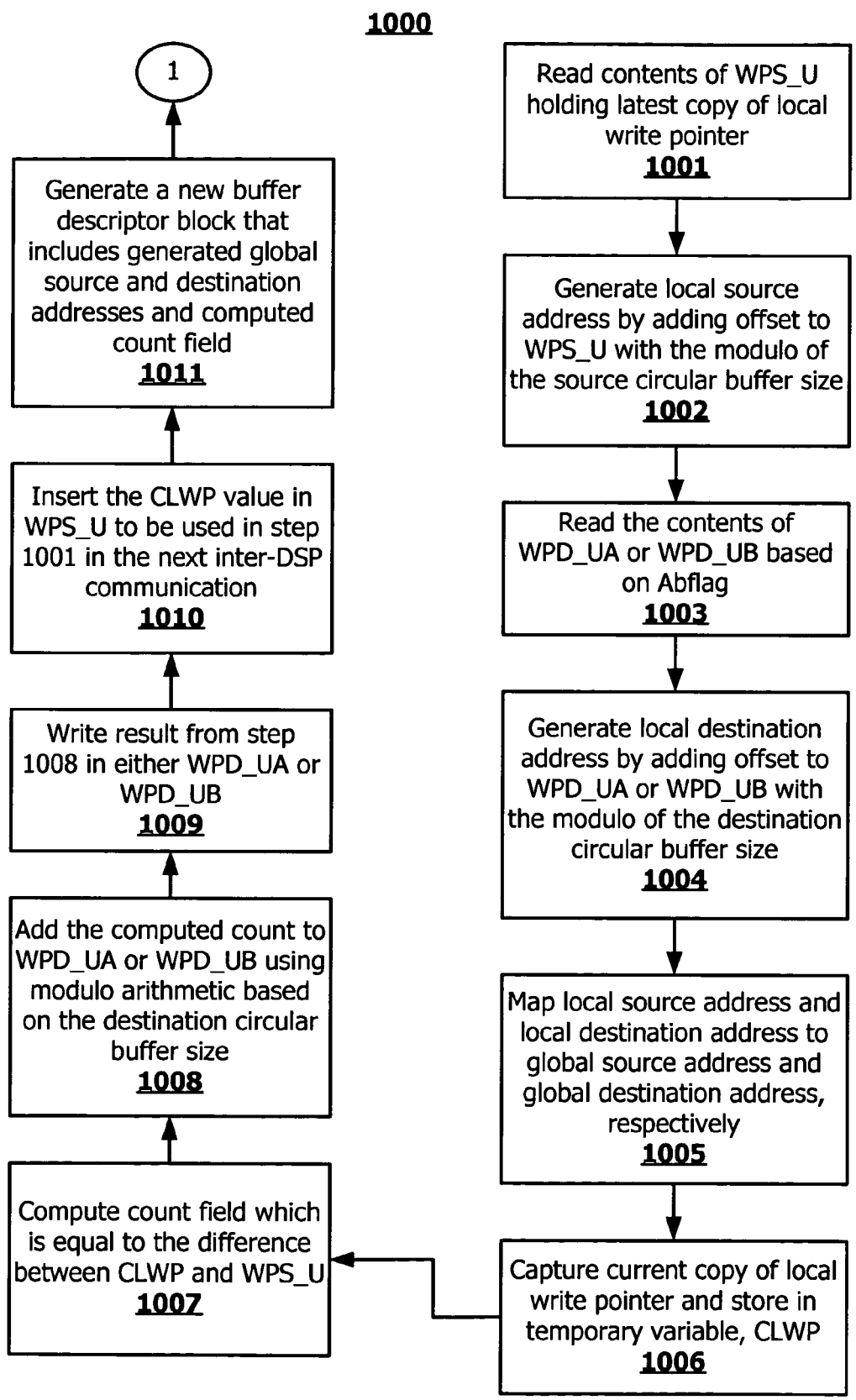
FIGS. 10A & 10B is a flowchart of a method for performing a background process in an owner DSP processor core in the owner data driven protocol in accordance with an embodiment of the present invention.
Figure 10B:
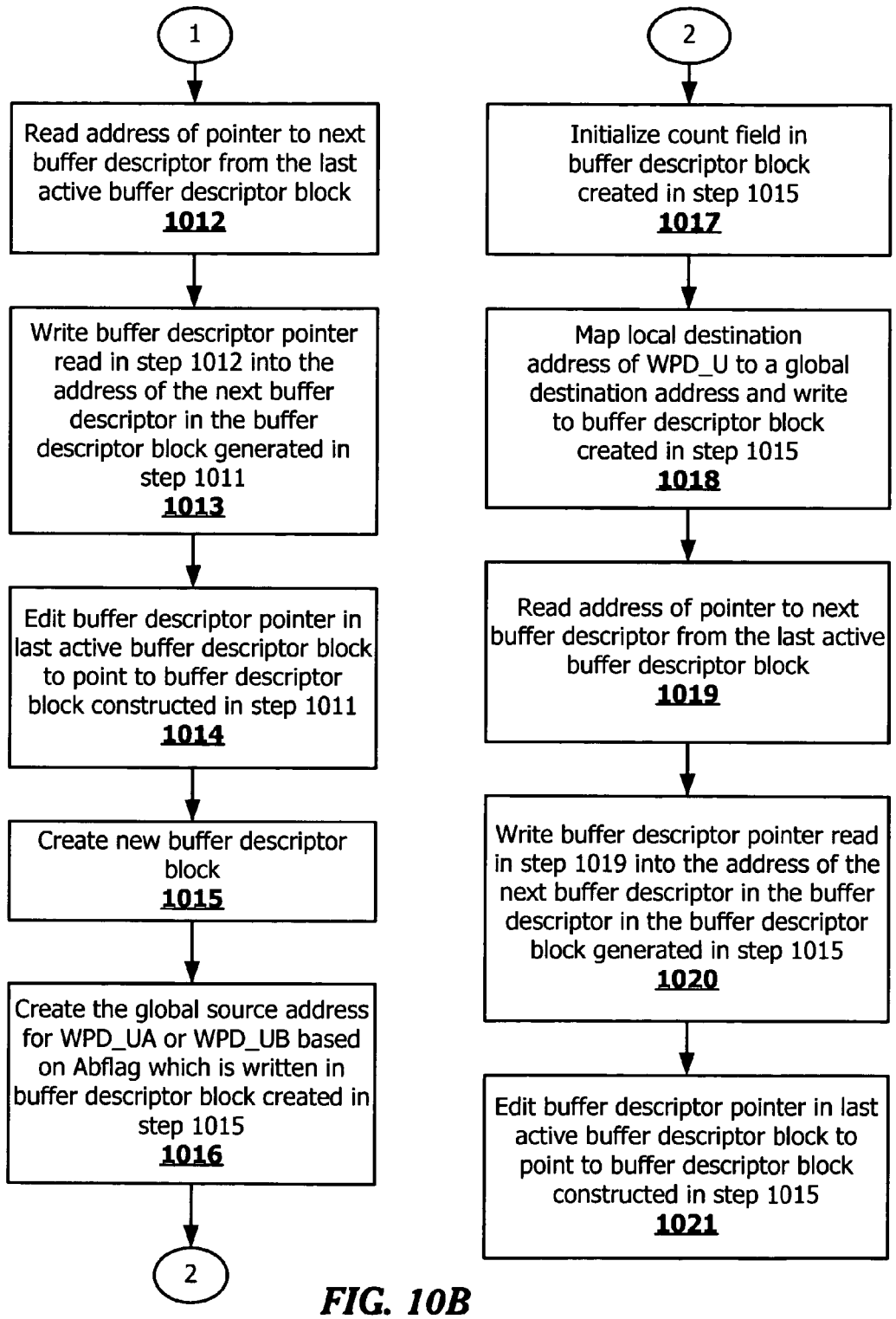

FIGS. 10A & 10B—Flowchart of the Background Process in the Owner DSP Processor Core in Owner Data Driven Protocol FIGS. 10A & 10B is a flowchart of an embodiment of the present invention of a method 1000 a background process in the owner DSP processor core 302, e.g., DSP processor core 302A, in the owner data driven protocol.

Referring to FIGS. 10A & 10B, in conjunction with FIGS. 1-8, in step 1001, the background process reads the contents of WPS_U holding the last copy of the local write pointer captured for the previous DMA transfer. In step 1002, the background process generates a local source address by adding an offset to WPS_U (offset may equal the value of "1" or the value of "2" in the case of storing 16 bits and where addresses are byte addresses) with the modulo of the size of source circular buffer 402.

In step 1003, the background process reads the contents of WPD_UA or WPD_UB (based on the state of the ABflag) storing write pointer captured for the previous DMA transfer. In step 1004, the background process generates the local destination address by adding the offset to either WPD_UA or WPD_UB (the entry selected by the background process in step 1003) (offset may equal the value of "1" or the value of "2" in the case of storing 16 bits and where addresses are byte addresses) with the modulo of the size of destination circular buffer 402.

In step 1005, the background process maps the local source address and the local destination address to a global source address and a global destination address, respectively.

In step 1006, the background process captures the current copy of the local write pointer 502 and stores it in a temporary variable, referred to herein as "CLWP."

In step 1007, the background process computes the count field, which is equal to the difference between the value stored in CLWP and WPS_U, using the modulo arithmetic based on the size of source circular buffer 402. The count field may equal the number of bytes or words inserted in the source circular buffer 402 from the last DMA transfer.

In step 1008, the background process adds the computed count to WPD_UA or WPD_UB variable (based on the state of the ABflag) using modulo arithmetic based on the size of destination circular buffer 402. In step 1009, the background process writes the result from step 1008 in WPD_UA or WPD_UB based on whether it read WPD_UA or WPD_UB, respectively. It should be noted that DMA controller 204 may be accessing either WPD_UA or WPD_UB at any arbitrary time. As stated above, a flag, referred to herein as the "Abflag," may be used to ensure that the background process is not writing to the same location as DMA controller 204 thereby avoiding a collision.

In step 1010, the background process inserts the CLWP value in WPS_U to be used in step 1001 in the next inter-DSP communication.

In step 1011, the background process generates a new buffer descriptor block 700 that includes the generated global source and destination address and computed count field.

In step 1012, the background process reads the address of the pointer to the next buffer descriptor block from the last active buffer descriptor block 700. In step 1013, the background process writes the buffer descriptor pointer read in step 1012 into the address of the next buffer descriptor in the buffer descriptor block 700 generated in step 1011.

In step 1014, the background task edits the next buffer descriptor block from the last active buffer descriptor block 700 to point to buffer descriptor block 700 constructed in step 1011.

In Step 1015, the background task creates a new buffer descriptor block 700 to be filled with parameters generated in later steps.

In step 1016, the background task maps the local source address (WPD_UA or WPD_UB based on ABflag) to a global source address which may be written into buffer descriptor block 700 created in step 1015. In step 1017, the background task initializes the count field, e.g., initializes the count field to 1, of buffer descriptor block 700 created in step 1015. In step 1018, the background task maps the local destination address of WPD_U to a global destination address.

In step 1019, the background task reads the address of the pointer to the next buffer descriptor block from the last active buffer descriptor block 700. In step 1020, the background process writes the buffer descriptor pointer read in step 1019 into the address of the next buffer descriptor in the buffer descriptor block 700 generated in step 1015.

In step 1021, the background task edits the next buffer descriptor block from the last active buffer descriptor block 700 to point to buffer descriptor block 700 constructed in step 1015.

It is noted that method 1000 may include other and/or additional steps that, for clarity, are not depicted. It is further noted that method 1000 may be executed in a different order presented and that the order presented in the discussion of FIGS. 10A & 10B is illustrative. It is further noted that certain steps in method 1000 may be executed in a substantially simultaneous manner.

An architecture to facilitate inter-DSP data communications for the user data driven protocol is provided below in association with FIG. 11.

FIG. 11—Architecture to Facilitate Inter-DSP Data Communications for User Data Driven Protocol FIG. 11 illustrates an embodiment of the present invention of an architecture for facilitating inter-DSP data communications for the user data driven protocol.

Referring to FIG. 11, owner task 601 in the owner DSP processor core 302, e.g., DSP processor core 302A, may contain an entry in its data structure to store an address of write pointer 502 (FIG. 5). Owner task 601 may further contain an entry in its data structure storing an indication of the size of its circular buffer 402, as identified by "Mod Size." Owner task 601 may further contain an entry in its data structure storing an indication as to the maximum number of words written in a period of time by the owner DSP processor core 302, as identified by "WPF." Owner task 601 may further contain an entry, as identified by "Address of RP," in its data structure storing an address of read pointer 503 (FIG. 5). Owner task 601 may further contain an entry, as identified by "RPS_O," in its data structure for storing the latest copy of read pointer 503 retrieved from either the entry RPS_OA or RPS_OB in the user DSP processor core 302 (discussed further below) by DMA controller 204. The particular entry, RPS_OA or RPS_OB, may be selected by DMA controller 204 based on the state of a flag, referred to herein as the "ABflag," as discussed in greater detail further below.

User task 602 in the user DSP processor core 302, e.g., DSP processor core 302B, may contain an entry in its data structure to store an address of read pointer 503. A copy of read pointer 503 may be stored in an entry in its data structure indicated by "RPD_O." As stated above, the owner and the user DSP processor cores 302 may contain a different modulo buffer size and hence the RPD_O may have to be converted to point to the appropriate address in the owner DSP processor core 302. This converted address may be stored in either the entry indicated as RPS_OA or RPS_OB in the user task 602.

In the user data driven protocol, there are two DMA data movements as explained below in association with FIG. 12.

FIG. 12—Method for Facilitating Inter-DSP Data Communications for User Data Driven Protocol FIG. 12 is a flowchart of an embodiment of the present invention of a method 1200 for facilitating inter-DSP communications for the user data driven protocol.

Referring to FIG. 12, in conjunction with FIGS. 1-7 and 11, in step 1201, DMA controller 204 receives a request from a DSP processor core 302, e.g., DSP processor core 302A, to begin a cycle of transferring data from one DSP processor core 302, e.g., DSP processor core 302A, to another DSP processor core 302, e.g., DSP processor core 302B. A cycle, e.g., 30 μs, may refer to a length of time to complete a transfer of data movements involved in a single request from a DSP processor core.

In step 1202, DMA controller 204 reads a data structure, referred to herein as a "DMA controller descriptor block," to obtain a pointer that points to a buffer descriptor block 700. The DMA controller descriptor block may refer to a data structure used to store information to describe DMA controller 204.

In step 1203, DMA controller 204 reads the buffer descriptor block 700 identified by the pointer obtained in step 1202. As stated above, buffer descriptor block 700 may contain, in the entry identified by "S_addr," a source address used to identify a global address in the system memory address space. This source address corresponds to a local address in the local memory of the owner DSP processor core 302, e.g., DSP processor core 302A. In particular, this source address corresponds to a local address in a memory segment 501 in the circular buffer 402 that is a number of bytes or words, as identified in the entry COUNT, behind the memory segment 501 identified by write pointer 502. Buffer descriptor block 700 may further contain, in the entry identified by "COUNT," information as to a length of a block of memory, i.e., a number of bytes or words of the data. Buffer descriptor block 700 may further contain, in the entry identified by "D_addr," a destination address used to identify a local address in the user DSP processor core 302, e.g., DSP processor core 302B.

In step 1204, DMA controller 204 initiates a first DMA transfer of moving data from the source address in the circular buffer 402 of the owner DSP processor core 302 to the destination address in the circular buffer 402 of the user DSP processor core 302. The size of the transfer corresponds to the number of bytes as indicated in the COUNT entry in the buffer descriptor block 700 read in step 1203.

In step 1205, DMA controller 204 obtains a pointer from buffer descriptor block 700 read in step 903 to identify a second buffer descriptor block 700. As stated above, buffer descriptor block 700 may contain an entry that stores a pointer to another block descriptor block 700 if there is another DMA data transfer involved in the request received in step 1201. If there is not another DMA data transfer involved in the request received in step 1201, then the entry in block descriptor block 700 that identifies the address of the next block descriptor block 700 would be null. DMA controller 204 may then wait until it receives another request from a DSP processor core 302, e.g., DSP processor core 302A, to begin another cycle of transferring data from one DSP processor core 302, e.g., DSP processor core 302A, to another DSP processor core 302, e.g., DSP processor core 302B.

In step 1206, DMA controller 204 reads block descriptor block 700 identified in step 1205. As stated above, buffer descriptor block 700 may contain, in the entry identified by "S_addr," a source address used to identify a global address in the system memory address space. This source address corresponds to a local address in the local memory of the user DSP processor core 302, e.g., DSP processor core 302B. In particular, this source address corresponds to the local address in the local memory of the user DSP processor core 302 which may either RPS_OA or RPS_OB, based on the Abflag state. Buffer descriptor block 700 may further contain, in the entry identified by "D_addr," a destination address used to identify a local address in the owner DSP processor core 302, e.g., DSP processor core 302A of the owner DSP address of RPS_O.

In step 1207, DMA controller 204 initiates a second DMA transfer of moving the current contents of RPS_OA or RPS_OB data from the source address of the user DSP processor core 302 (corresponds to the local address in the local memory of the user DSP processor core 302 that may either be RPS_OA or RPS_OB) to the destination address of the owner DSP processor core 302 (corresponds to the local address in local memory of the owner DSP processor core 302 that stores read pointer 503). It is noted that the background task, as discussed below in association with FIGS. 13A & 13B, writes to either RPS_OA or RPS_OB in a given heartbeat where DMA controller 204 is accessing the other value. For example, the background task writes to RPS_OA if DMA controller 204 in that same heart beat window is going to read RPS_OB. Similarly, the background task writes to RPS_OB if DMA controller 204 in that same heart beat window is going to read RPS_OA. In one embodiment, a flag, referred to herein as the "ABflag," toggles between 0 and 1 which can be used by the background task to assure synchronization such that the background task may not attempt to write to the same RPS_O value that DMA controller 204 is accessing in the same heartbeat.

It is noted that method 1200 may include other and/or additional steps that, for clarity, are not depicted. It is further noted that method 1200 may be executed in a different order presented and that the order presented in the discussion of FIG. 12 is illustrative. It is further noted that certain steps in method 1200 may be executed in a substantially simultaneous manner.

During the user data driven protocol, a background process may occur in the user DSP processor core 302 as described below in association with FIGS. 13A & 13B.

Figure 13A:
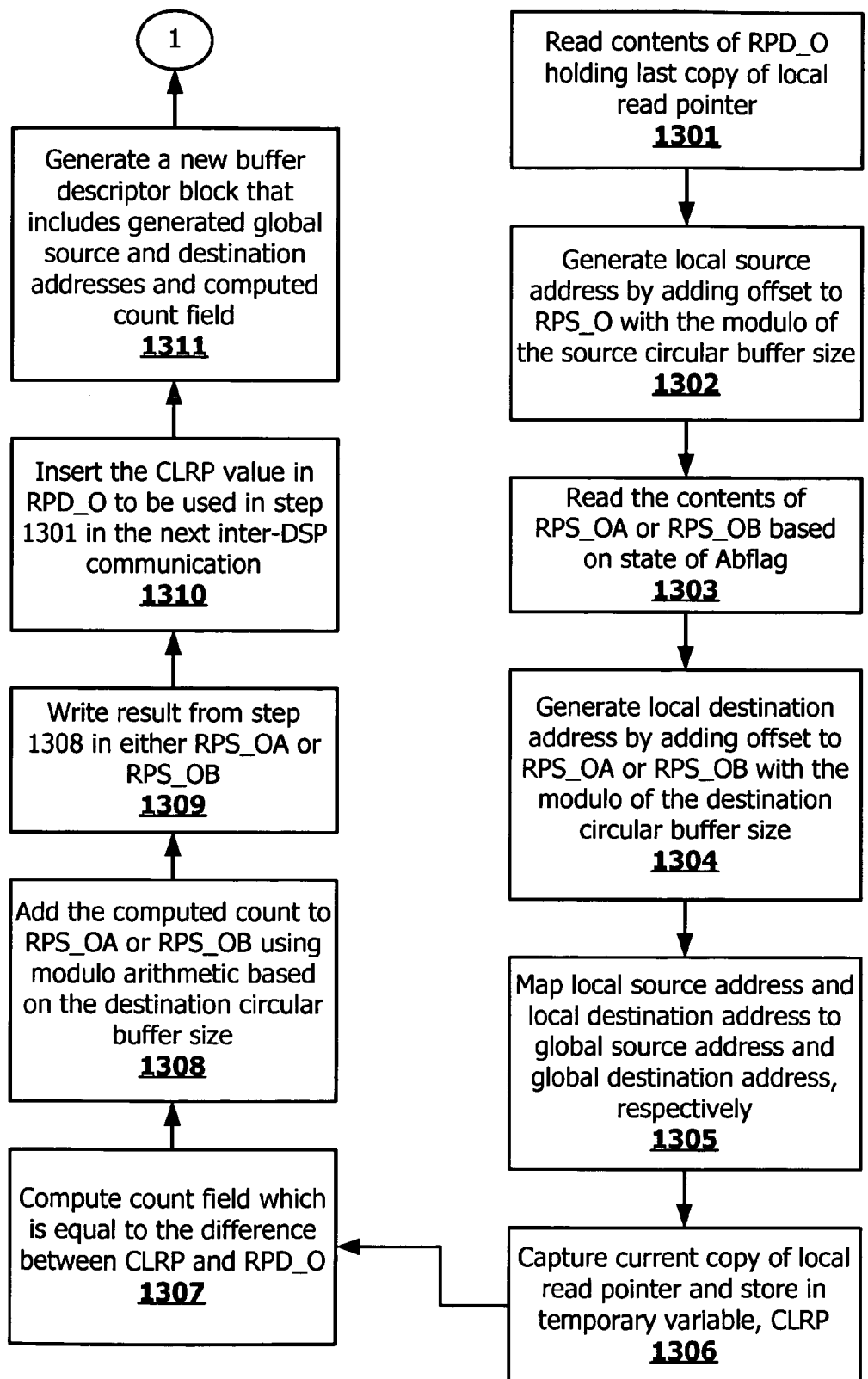
FIGS. 13A & 13B is a flowchart of a method for performing a background process in a user DSP processor core in the user data driven protocol in accordance with an embodiment of the present invention.
Figure 13B:
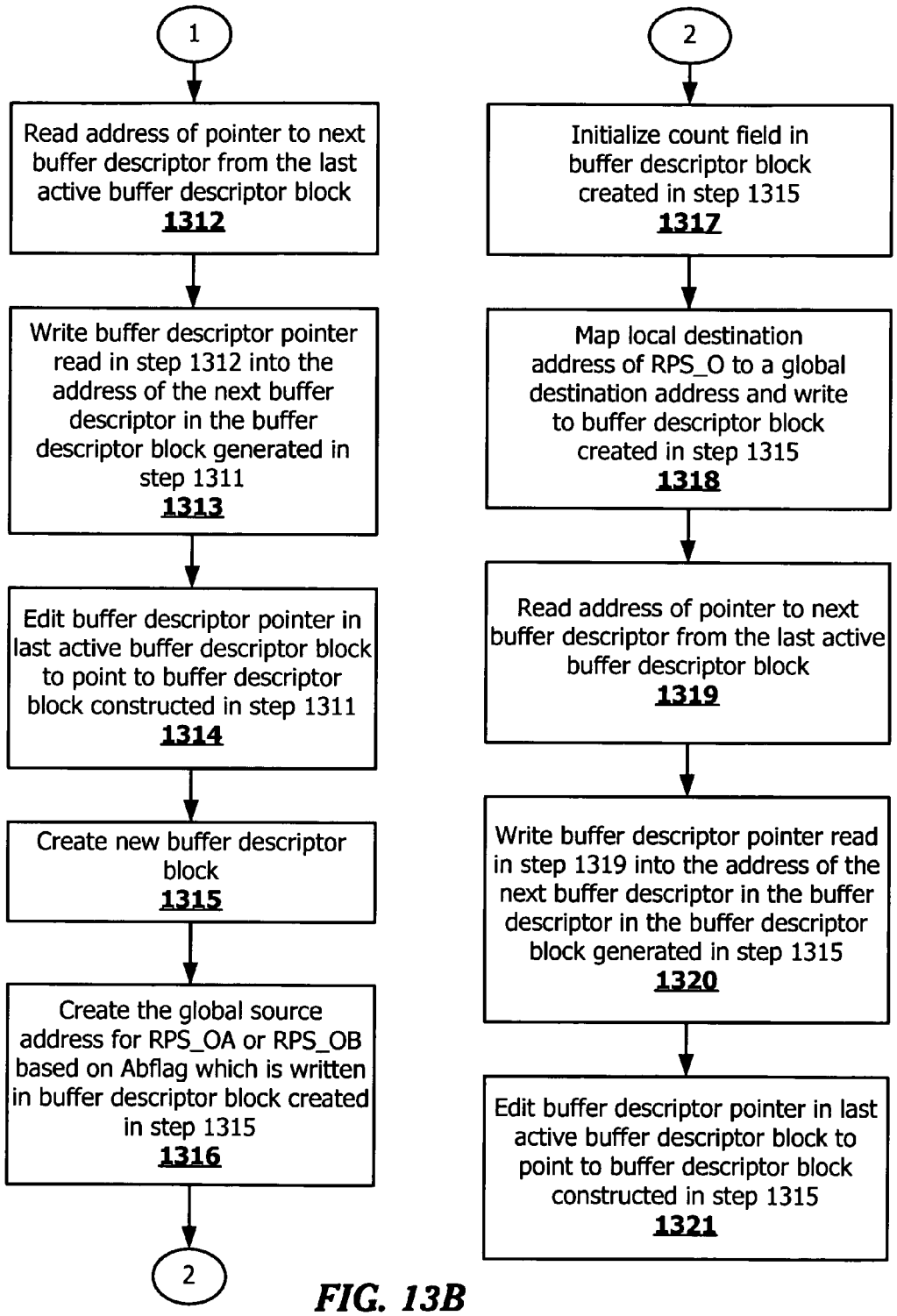

FIGS. 13A & 13B—Flowchart of the Background Process in the User DSP Processor Core in User Data Driven Protocol FIGS. 13A & 13B is a flowchart of an embodiment of the present invention of a method 1300 a background process in the user DSP processor core 302, e.g., DSP processor core 302B, in the user data driven protocol.

Referring to FIGS. 13A & 13B, in conjunction with FIGS. 1-7 and 11-12, in step 1301, the background process reads the contents of RPD_O holding the latest copy of the local address of read pointer 503 captured for the previous DMA transfer. In step 1302, the background process generates a local destination address by adding an offset to RPD_O (offset may equal the value of "1" or the value of "2" in the case of storing 16 bits and where addresses are byte addresses) with the modulo of the size of destination circular buffer 402.

In step 1303, the background process reads the contents of RPS_OA or RPS_OB (based on the state of the ABflag) storing read pointer captured for the previous DMA transfer. In step 1304, the background process generates the local source address by adding the offset to either RPS_OA or RPS_OB (entry selected by the background process in step 1303) (offset may equal the value of "1" or the value of "2" in the case of storing 16 bits and where addresses are byte addresses) with the modulo of the size of source circular buffer 402.

In step 1305, the background process maps the local source address and the local destination address to a global source address and a global destination address, respectively.

In step 1306, the background process captures the current copy of the local address of read pointer 503 and stores it in a temporary variable, referred to herein as "CLRP."

In step 1307, the background process computes the count field, which is equal to the difference between the value stored in CLRP and RPD_O, using the modulo arithmetic based on the size of destination circular buffer 402. The count field may equal the number of bytes or words inserted in the destination circular buffer 402 from the last DMA transfer.

In step 1308, the background process adds the computed count to RPS_OA or RPS_OB variable (based on the state of the ABflag) using modulo arithmetic based on the size of source circular buffer 402. In step 1309, the background process writes the result from step 1308 in RPS_OA or RPS_OB based on whether it read RPS_OA or RPS_OB, respectively. It should be noted that DMA controller 204 may be accessing either RPS_OA or RPS_OB at any arbitrary time. As stated above, a flag, referred to herein as the "ABflag," may be used to ensure that the background process is not writing to the same location as DMA controller 204 thereby avoiding a collision.

In step 1310, the background process inserts the CLRP value in RPD_O to be used in step 1301 in the next inter-DSP communication.

In step 1311, the background process generates a new buffer descriptor block 700 that includes the generated global source and destination address and computed count field.

In step 1312, the background process reads the address of the pointer to the next buffer descriptor block from the last active buffer descriptor block 700. In step 1313, the background process writes the buffer descriptor pointer read in step 1312 into the address of the next buffer descriptor in the buffer descriptor block 700 generated in step 1311.

In step 1314, the background task edits the next buffer descriptor block from the last active buffer descriptor block 700 to point to buffer descriptor block 700 constructed in step 1311.

In step 1315, the background task creates a buffer descriptor block 700 to be filled with parameters generated in later steps.

In step 1316, the background task maps the local source address (RPS_OA or RPS_OB based on ABflag) to a global source address which may be written into the buffer descriptor created in step 1315. In step 1317, the background task initializes the count field, e.g., initializes the count field to 1 in buffer descriptor block 700 created in step 1315. In step 1318, the local destination address of RPS_O is mapped to a global destination address.

In step 1319, the background task reads the address of the pointer to the next buffer descriptor block from the last active buffer descriptor block 700. In step 1320, the background process writes the buffer descriptor pointer read in step 1319 into the address of the next buffer descriptor in the buffer descriptor block 700 generated in step 1315

In step 1321, the background task edits the next buffer descriptor block from the last active buffer descriptor block 700 to point to buffer descriptor block 700 constructed in step 1315.

It is noted that method 1300 may include other and/or additional steps that, for clarity, are not depicted. It is further noted that method 1300 may be executed in a different order presented and that the order presented in the discussion of FIGS. 13A & 13B is illustrative. It is further noted that certain steps in method 1300 may be executed in a substantially simultaneous manner.

An architecture to facilitate inter-DSP data communications for the safe data drive protocol is provided below in association with FIG. 14.

FIG. 14—Architecture to Facilitate Inter-DSP Data Communications for Safe Data Driven Protocol FIG. 14 illustrates an embodiment of the present invention of an architecture for facilitating inter-DSP data communications for the safe data driven protocol.

Referring to FIG. 14, owner task 601 in the owner DSP processor core 302, e.g., DSP processor core 302A, may contain an entry in its data structure to store an address of write pointer 502 (FIG. 5). Owner task 601 may further contain an entry in its data structure storing an indication of the size of its circular buffer 402, as identified by "Mod Size." Owner task 601 may further contain an entry in its data structure storing an indication as to the maximum number of words written in a period of time by the owner DSP processor core 302, as identified by "WPF." Owner task 601 may further contain an entry, as identified by "Address of RP," in its data structure storing an address of read pointer 503 (FIG. 5). Owner task 601 may further contain an entry, as identified by "RPS_O," in its data structure for storing the latest copy of the address of read pointer 503 retrieved from either the entry RPS_OA or RPS_OB in the user DSP processor core 302 (discussed further below) by DMA controller 204. The particular entry, RPS_OA or RPS_OB, may be selected by DMA controller 204 based on the state of a flag, referred to herein as the "ABflag." Owner task 601 in the owner DSP processor core 302, e.g., DSP processor core 302A, may further contain an entry in its data structure to store an address of write pointer 502 (FIG. 5) as well as an entry to store the latest copy of the address of write pointer 502, as indicated by "WPS_U." As stated above, the owner and user DSP processor cores 302 may contain a different modulo buffer size and hence the WPS_U value may have to be converted to point to the appropriate address in the user DSP processor core 302. This converted address may be stored in either the entry indicated as WPD_UA or WPD_UB in the owner task 601.

User task 602 in the user DSP processor core 302, e.g., DSP processor core 302B, may contain an entry in its data structure to store an address of read pointer 503 (FIG. 5). User task 602 may further contain an entry in its data structure storing an indication of the size of its circular buffer 402, as identified by "Mod Size." User task 602 may further contain an entry in its data structure storing an indication as to the maximum number of words read in a period of time by the user DSP processor core 302, as identified by "WPF." User task 602 may further contain an entry, as identified by "Address of WP," in its data structure storing an address of the write pointer. User task 602 may further contain an entry, as identified by "WPD_U," in its data structure for storing the address of the write pointer in either entry WPD_UA or WPD_UB received from DMA controller 204. The particular entry, WPD_UA or WPD_UB, may be selected by DMA controller 204 based on state of a flag, referred to herein as the "AB'flag." User task 602 in the user DSP processor core 302, e.g., DSP processor core 302B, may further contain an entry in its data structure to store read pointer 503. A copy of read pointer 503 may be stored in an entry in its data structure indicated by "RPD_O." As stated above, the owner and the user DSP processor cores 302 may contain a different modulo buffer size and hence the RPD_O may have to be converted to point to the appropriate address in the owner DSP processor core 302. This converted address may be stored in either the entry indicated as RPS_OA or RPS_OB in the user task 602.

In the safe data driven protocol, there are three DMA data movements as explained below in association with FIG. 15.

FIG. 15—Method for Facilitating Inter-DSP Data Communications for Safe Data Driven Protocol FIG. 15 is a flowchart of an embodiment of the present invention of a method 1500 for facilitating inter-DSP communications for the safe data driven protocol.

Referring to FIG. 15, in conjunction with FIGS. 1-7 and 14, in step 1501, DMA controller 204 receives a request from a DSP processor core 302, e.g., DSP processor core 302A, to begin a cycle of transferring data from one DSP processor core 302, e.g., DSP processor core 302A, to another DSP processor core 302, e.g., DSP processor core 302B. A cycle, e.g., 30 μs, may refer to a length of time to complete a transfer of data movements involved in a single request from a DSP processor core.

In step 1502, DMA controller 204 reads a data structure, referred to herein as a "DMA controller descriptor block," to obtain a pointer that points to a buffer descriptor block 700. The DMA controller descriptor block may refer to a data structure used to store information to describe DMA controller 204.

In step 1503, DMA controller 204 reads the buffer descriptor block 700 identified by the pointer obtained in step 1502. As stated above, buffer descriptor block 700 may contain, in the entry identified by "S_addr," a source address used to identify a global address in the system memory address space. This source address corresponds to a local address in the local memory of the owner DSP processor core 302, e.g., DSP processor core 302A. In particular, this source address corresponds to the local address in a memory segment 501 in the circular buffer 402 that is a number of bytes or words, as identified by the entry COUNT, behind the memory segment 501 identified by write pointer 502. Buffer descriptor block 700 may further contain, in the entry identified by "COUNT," information as to a length of a block of memory, i.e., a number of bytes or words of the data. Buffer descriptor block 700 may further contain, in the entry identified by "D_addr," a destination address used to identify a local address in the user DSP processor core 302, e.g., DSP processor core 302B.

In step 1504, DMA controller 204 initiates a first DMA transfer of moving data from the source address in the circular buffer 402 of the owner DSP processor core 302 to the destination address in the circular buffer 402 of the user DSP processor core 302. The size of the transfer corresponds to the number of bytes as indicated in the COUNT entry in the buffer descriptor block 700 read in step 1503.

In step 1505, DMA controller 204 obtains a pointer from buffer descriptor block 700 read in step 903 to identify a second buffer descriptor block 700. As stated above, buffer descriptor block 700 may contain an entry that stores a pointer to another block descriptor block 700 if there is another DMA data transfer involved in the request received in step 1501. If there is not another DMA data transfer involved in the request received in step 1501, then the entry in block descriptor block 700 that identifies the address of the next block descriptor block 700 would be null. DMA controller 204 may then wait until it receives another request from a DSP processor core 302, e.g., DSP processor core 302A, to begin another cycle of transferring data from one DSP processor core 302, e.g., DSP processor core 302A, to another DSP processor core 302, e.g., DSP processor core 302B.

In step 1506, DMA controller 204 reads block descriptor block 700 identified in step 1505. As stated above, buffer descriptor block 700 may contain, in the entry identified by "S_addr," a source address used to identify a global address in the system memory address space. This source address corresponds to a local address in the local memory of the user DSP processor core 302, e.g., DSP processor core 302B. For example, this source address corresponds to the local address in the local memory of the user DSP processor core 302. In particular, this source address corresponds to the local address in the local memory of the user DSP processor core 302 which may either be RPS_OA or RPS_OB based on the Abflag state. Buffer descriptor block 700 may further contain, in the entry identified by "D_addr," a destination address used to identify a local address in DSP processor core 302, e.g., the owner DSP processor core 302A, of the owner DSP address of RPS_O.

In step 1507, DMA controller 204 initiates a second DMA transfer of moving the current contents of RPS_OA or RPS_OB data from the source address of the user DSP processor core 302 (corresponds to the local address in the local memory of the user DSP processor core 302 which may either be RPS_OA or RPS_OB) to the destination address of the owner DSP processor core 302 (corresponds to the local address in the local memory of the owner DSP processor core 302 that stores read pointer 503). It is noted that the background task, as discussed above in association with FIGS. 13A & 13B, writes to either RPS_OA or RPS_OB in a given heartbeat where DMA controller 204 is accessing the other value. For example, the background task writes to RPS_OA if DMA controller 204 in that same heart beat window is going to read RPS_OB. Similarly, the background task writes to RPS_OB if DMA controller 204 in that same heart beat window is going to read RPS_OA. In one embodiment, a flag, referred to herein as the "ABflag," toggles between 0 and 1 which can be used by the background task to assure synchronization such that the background task may not attempt to write to the same RPS_O value that DMA controller 204 is accessing in the same heartbeat.

In step 1508, DMA controller 204 obtains a pointer from buffer descriptor block 700 read in step 1506 to identify a third buffer descriptor block 700. As stated above, buffer descriptor block 700 may contain an entry that stores a pointer to another block descriptor block 700 if there is another DMA data transfer involved in the request received in step 1501. If there is not another DMA data transfer involved in the request received in step 1501, then the entry in block descriptor block 700 that identifies the address of the next block descriptor block 700 would be null. DMA controller 204 may then wait until it receives another request from a DSP processor core 302, e.g., DSP processor core 302A, to begin another cycle of transferring data from one DSP processor core 302, e.g., DSP processor core 302A, to another DSP processor core 302, e.g., DSP processor core 302B.

In step 1509, DMA controller 204 reads block descriptor block 700 identified in step 1508. As stated above, buffer descriptor block 700 may contain, in the entry identified by "S_addr," a source address used to identify a global address in the system memory address space. This source address corresponds to a local address in the local memory of the owner DSP processor core 302, e.g., DSP processor core 302A. For example, this source address corresponds to the local address in the local memory of the owner DSP processor core 302. In particular, this source address corresponds to the local address in the local memory of the owner DSP processor core 302 that may either be WPD_UA or WPD_UB, based on the Abflag status. Buffer descriptor block 700 may further contain, in the entry identified by "D_addr," a destination address used to identify a local address in DSP processor core 302, e.g., the user DSP processor core 302B, of the user DSP address of WPD_U.

In step 1510, DMA controller 204 initiates a third DMA transfer of moving the current contents of WPS_UA or WPS_UB data from the source address the owner DSP processor core 302 (corresponds to the local address in the local memory of the owner DSP processor core 302 which may either be WPS_UA or WPS_UB) to the destination address of the user DSP processor core 302 that stores write pointer 502. It is noted that the background task, as discussed above in association with FIGS. 10A & 10B, writes to either WPS_UA or WPS_UB in a given heartbeat where DMA controller 204 is accessing the other value. For example, the background task writes to WPS_UA if DMA controller 204 in that same heart beat window is going to read WPS_UB. Similarly, the background task writes to WPS_UB if DMA controller 204 in that same heart beat window is going to read WPS_UA. In one embodiment, a flag, referred to herein as the "ABflag," toggles between 0 and 1 which can be used by the background task to assure synchronization such that the background task may not attempt to write to the same RPS_U value that DMA controller 204 is accessing in the same heartbeat.

It is noted that in one embodiment, one of the two background tasks, as described in FIGS. 10 and 13, may enable a block of data to be moved using a DMA request while both background tasks may be sending their pointer updates to the other DSP processor core 302 using other DMA requests. If both background tasks request the data movement, then the same block of data may be sent twice thereby resulting in excess traffic on the bus connecting the two DSP processor cores 302.

It is noted that method 1500 may include other and/or additional steps that, for clarity, are not depicted. It is further noted that method 1500 may be executed in a different order presented and that the order presented in the discussion of FIG. 12 is illustrative. For example, steps 1508-1510 may be executed prior steps 1505-1507. It is further noted that certain steps in method 1500 may be executed in a substantially simultaneous manner.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for facilitating inter-digital signal processing (DSP) data communications comprising the steps of:

reading a first data structure associated with a block of local memory in a first DSP processor core in a complex comprising a plurality of DSP processor cores, wherein said first data structure comprises a first source address indicating a first address of where data is stored in said local memory of said first DSP processor core, wherein said first data structure further comprises an indication of a size of a block of memory, wherein said first data structure further comprises a first destination address indicating a second address of where data is to be stored in a local memory of a second DSP processor core;

initiating a transfer of moving data said size of said block of memory located in said first source address in said local memory of said first DSP processor core to said first destination address in said local memory of said second DSP processor core;

obtaining a pointer to a second data structure from said first data structure;

reading said second data structure, wherein said second data structure comprises a second source address of one of a read pointer and a write pointer, wherein said second data structure further comprises a second destination address of one of said read pointer and said write pointer.

2. The method as recited in claim 1 further comprising the step of:

initiating a transfer of said write pointer located in said second source address in said local memory of said first DSP processor core to said second destination address in said local memory of said second DSP processor core.

3. The method as recited in claim 1 further comprising the step of:

initiating a transfer of said read pointer located in said second source address in said local memory of said second DSP processor core to said second destination address in said local memory of said first DSP processor core.

4. The method as recited in claim 1 further comprising the steps of:

obtaining a pointer to a third data structure from said second data structure;

reading said third data structure, wherein said third data structure comprises a third source address of one of a read pointer and a write pointer, wherein said third data structure further comprises a third destination address of one of said read pointer and said write pointer.

5. The method as recited in claim 4 further comprising the steps of:

initiating a transfer of said write pointer located in said second source address in said local memory of said first DSP processor core to said second destination address in said local memory of said second DSP processor core; and initiating a transfer of said read pointer located in said third source address in said local memory of said second DSP processor core to said third destination address in said local memory of said first DSP processor core.

6. The method as recited in claim 4 further comprising the steps of:

initiating a transfer of said write pointer located in said third source address in said local memory of said first DSP processor core to said third destination address in said local memory of said second DSP processor core; and initiating a transfer of said read pointer located in said second source address in said local memory of said second DSP processor core to said second destination address in said local memory of said first DSP processor core.

7. The method as recited in claim 1 further comprising the steps of:

converting a local address of said write pointer to a global address; and computing said first source address in said first data structure, wherein said first source address is equal to said size of a block of memory subtracted from said global address of said write pointer.

8. The method as recited in claim 7 further comprising the steps of:

reading said local address of said write pointer; and copying said local address of said write pointer into an entry in a third data structure located in said first DSP processor core.

9. The method as recited in claim 7 further comprising the steps of:

reading a local address of said read pointer; and copying said local address of said read pointer into an entry in a third data structure located in said second DSP processor core.

* * * * *